(12) United States Patent
Zhao et al.

(10) Patent No.: US 11,368,766 B2
(45) Date of Patent: Jun. 21, 2022

(54) SYSTEM AND METHOD FOR SIGNALING SECURITY AND DATABASE POPULATION

(71) Applicant: Verance Corporation, San Diego, CA (US)

(72) Inventors: Jian Zhao, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 17/011,834

(22) Filed: Sep. 3, 2020

(65) Prior Publication Data
US 2021/0127179 A1    Apr. 29, 2021

Related U.S. Application Data

(63) Continuation of application No. 16/094,456, filed as application No. PCT/US2017/028198 on Apr. 18, 2017, now abandoned.
(Continued)

(51) Int. Cl.
*H04N 21/8358* (2011.01)
*G06T 1/00* (2006.01)
(Continued)

(52) U.S. Cl.
CPC ....... *H04N 21/8358* (2013.01); *G06T 1/0085* (2013.01); *H04N 21/2389* (2013.01);
(Continued)

(58) Field of Classification Search
CPC ........... H04N 21/8358; H04N 21/8586; H04N 21/812; H04N 21/84; H04N 21/8456;
(Continued)

(56) References Cited

U.S. PATENT DOCUMENTS 6,122,610 A    9/2000   Isabelle
6,145,081 A    11/2000   Winograd et al.
(Continued)

FOREIGN PATENT DOCUMENTS

JP    2004163855    6/2004
JP    2004173237    6/2004
(Continued)

OTHER PUBLICATIONS

Aris Technologies, Inc. "Audio Watermarking System to Screen Digital Audio Content for LCM Acceptance," May 1999 (17 pages).
(Continued)

*Primary Examiner* — Michael R Telan
(74) *Attorney, Agent, or Firm* — Perkins Coie LLP; Donald L. Wenskay

(57) ABSTRACT

The disclosed technology relates to methods, devices, systems and computer program products that facilitate access to metadata associated with a content. In one example, a method is described that includes receiving a multimedia content at a receiver device, extracting a watermark message from a first segment of the multimedia content, using at least a portion of the first watermark message to obtain additional information regarding the first segment of the multimedia content that includes the first watermark message, and associating and storing one or more values of the first watermark message and the additional information. The method further includes repeating the above operations to extract additional watermark messages from additional segments of the content and to form a table or array of items that can be accessed by specifying the one or more values of the first watermark message or one or more values of the additional watermark messages.

31 Claims, 17 Drawing Sheets

Related U.S. Application Data

(60) Provisional application No. 62/367,018, filed on Jul. 26, 2016, provisional application No. 62/324,294, filed on Apr. 18, 2016.

(51) Int. Cl.
*H04N 21/442* (2011.01)
*H04N 21/2389* (2011.01)
*H04N 21/437* (2011.01)
*H04N 21/435* (2011.01)
*H04N 21/858* (2011.01)
*H04N 21/81* (2011.01)
*H04N 21/84* (2011.01)
*H04N 21/845* (2011.01)

(52) U.S. Cl.
CPC ..... *H04N 21/23892* (2013.01); *H04N 21/435* (2013.01); *H04N 21/437* (2013.01); *H04N 21/44204* (2013.01); *H04N 21/812* (2013.01); *H04N 21/84* (2013.01); *H04N 21/8456* (2013.01); *H04N 21/8586* (2013.01)

(58) Field of Classification Search
CPC ......... H04N 21/2389; H04N 21/44204; H04N 21/23892; H04N 21/437; H04N 21/435; G06T 1/0085
See application file for complete search history.

(56) References Cited

U.S. PATENT DOCUMENTS

| | | | |
|---|---|---|---|
| 6,175,627 B1 | 1/2001 | Petrovic et al. | |
| 6,427,012 B1 | 7/2002 | Petrovic | |
| 6,430,301 B1 | 8/2002 | Petrovic | |
| 6,683,958 B2 | 1/2004 | Petrovic | |
| 6,792,542 B1 | 9/2004 | Lee et al. | |
| 6,888,943 B1 | 5/2005 | Lam et al. | |
| 6,931,536 B2 | 8/2005 | Hollar | |
| 7,024,018 B2 | 4/2006 | Petrovic | |
| 7,159,118 B2 | 1/2007 | Petrovic | |
| 7,224,819 B2 | 5/2007 | Levy et al. | |
| 7,460,667 B2 | 12/2008 | Lee et al. | |
| 7,983,922 B2 | 7/2011 | Neusinger et al. | |
| 7,986,806 B2 | 7/2011 | Rhoads | |
| 7,991,995 B2 | 8/2011 | Rabin et al. | |
| 8,015,410 B2 | 9/2011 | Pelly et al. | |
| 8,055,013 B2 | 11/2011 | Levy et al. | |
| 8,059,815 B2 | 11/2011 | Lofgren et al. | |
| 8,059,858 B2 | 11/2011 | Brundage et al. | |
| 8,085,935 B2 | 12/2011 | Petrovic | |
| 8,138,930 B1 | 3/2012 | Heath | |
| 8,151,113 B2 | 4/2012 | Rhoads | |
| 8,181,262 B2 | 5/2012 | Cooper et al. | |
| 8,189,861 B1 | 5/2012 | Rucklidge | |
| 8,194,803 B2 | 6/2012 | Baum et al. | |
| 8,249,992 B2 | 8/2012 | Harkness et al. | |
| 8,280,103 B2 | 10/2012 | Petrovic et al. | |
| 8,301,893 B2 | 10/2012 | Brundage | |
| 8,302,122 B1* | 10/2012 | Hecht | H04N 21/2547 725/22 |
| 8,315,835 B2 | 11/2012 | Tian et al. | |
| 8,321,679 B2 | 11/2012 | Petrovic et al. | |
| 8,340,348 B2 | 12/2012 | Petrovic et al. | |
| 8,346,532 B2 | 1/2013 | Chakra et al. | |
| 8,346,567 B2 | 1/2013 | Petrovic et al. | |
| 8,467,717 B2 | 6/2013 | Croy et al. | |
| 8,479,225 B2 | 7/2013 | Covell et al. | |
| 8,533,481 B2 | 9/2013 | Petrovic et al. | |
| 8,538,066 B2 | 9/2013 | Petrovic et al. | |
| 8,588,459 B2 | 11/2013 | Bloom et al. | |
| 8,589,969 B2 | 11/2013 | Falcon | |
| 8,601,504 B2 | 12/2013 | Stone et al. | |
| 8,615,104 B2 | 12/2013 | Petrovic et al. | |
| 8,682,026 B2 | 3/2014 | Petrovic et al. | |
| 8,726,304 B2 | 5/2014 | Petrovic et al. | |
| 8,745,403 B2 | 6/2014 | Petrovic | |
| 8,781,967 B2 | 7/2014 | Tehranchi et al. | |
| 8,791,789 B2 | 7/2014 | Petrovic et al. | |
| 8,806,517 B2 | 8/2014 | Petrovic et al. | |
| 8,811,655 B2 | 8/2014 | Petrovic et al. | |
| 8,826,346 B1 | 9/2014 | Panje et al. | |
| 8,838,977 B2 | 9/2014 | Winograd et al. | |
| 8,838,978 B2 | 9/2014 | Winograd et al. | |
| 8,869,222 B2 | 10/2014 | Winograd et al. | |
| 8,923,548 B2 | 12/2014 | Petrovic et al. | |
| 9,009,482 B2 | 4/2015 | Winograd | |
| 9,055,239 B2 | 6/2015 | Tehranchi et al. | |
| 9,106,964 B2 | 8/2015 | Zhao | |
| 9,117,270 B2 | 8/2015 | Wong et al. | |
| 2002/0162118 A1 | 10/2002 | Levy et al. | |
| 2004/0009763 A1* | 1/2004 | Stone | H04H 20/14 455/410 |
| 2006/0239503 A1 | 10/2006 | Petrovic et al. | |
| 2007/0039018 A1 | 2/2007 | Saslow et al. | |
| 2011/0261667 A1 | 10/2011 | Ren et al. | |
| 2011/0293090 A1 | 12/2011 | Ayaki et al. | |
| 2011/0320627 A1 | 12/2011 | Landow et al. | |
| 2012/0023595 A1 | 1/2012 | Speare et al. | |
| 2012/0054194 A1 | 3/2012 | Gao et al. | |
| 2012/0072731 A1 | 3/2012 | Winograd et al. | |
| 2012/0102304 A1 | 4/2012 | Brave | |
| 2012/0122429 A1 | 5/2012 | Wood et al. | |
| 2012/0129547 A1 | 5/2012 | Andrews, III et al. | |
| 2012/0203556 A1 | 8/2012 | Villette et al. | |
| 2012/0203734 A1 | 8/2012 | Spivack et al. | |
| 2012/0216236 A1 | 8/2012 | Robinson et al. | |
| 2012/0265735 A1 | 10/2012 | McMillan et al. | |
| 2012/0272012 A1 | 10/2012 | Aronovich et al. | |
| 2012/0272327 A1 | 10/2012 | Shin et al. | |
| 2012/0300975 A1 | 11/2012 | Chalamala et al. | |
| 2012/0304206 A1 | 11/2012 | Roberts et al. | |
| 2012/0308071 A1 | 12/2012 | Ramsdell et al. | |
| 2013/0031579 A1 | 1/2013 | Klappert | |
| 2013/0060837 A1 | 3/2013 | Chakraborty et al. | |
| 2013/0073065 A1 | 3/2013 | Chen et al. | |
| 2013/0129303 A1 | 5/2013 | Lee et al. | |
| 2013/0151855 A1 | 6/2013 | Petrovic et al. | |
| 2013/0151856 A1 | 6/2013 | Petrovic et al. | |
| 2013/0152210 A1 | 6/2013 | Petrovic et al. | |
| 2013/0325622 A1 | 12/2013 | Kamitani et al. | |
| 2014/0067950 A1 | 3/2014 | Winograd | |
| 2014/0074855 A1 | 3/2014 | Zhao et al. | |
| 2014/0075465 A1 | 3/2014 | Petrovic et al. | |
| 2014/0075469 A1 | 3/2014 | Zhao | |
| 2014/0267907 A1 | 9/2014 | Downes et al. | |
| 2014/0270337 A1 | 9/2014 | Zhao et al. | |
| 2014/0279549 A1 | 9/2014 | Petrovic et al. | |
| 2014/0289873 A1 | 9/2014 | Morss et al. | |
| 2014/0325550 A1 | 10/2014 | Winograd et al. | |
| 2014/0325673 A1 | 10/2014 | Petrovic | |
| 2015/0030200 A1 | 1/2015 | Petrovic et al. | |
| 2015/0121534 A1 | 4/2015 | Zhao et al. | |
| 2015/0264429 A1 | 9/2015 | Winograd et al. | |
| 2016/0112771 A1 | 4/2016 | Choi et al. | |
| 2016/0301987 A1 | 10/2016 | Eyer | |

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |

(56) References Cited

FOREIGN PATENT DOCUMENTS

| WO | 2010135687 | 11/2010 |
|---|---|---|
| WO | 2011116309 | 9/2011 |
| WO | 2013163921 | 11/2013 |
| WO | 2014153199 | 9/2014 |

OTHER PUBLICATIONS

Bangaleea, R., et al., "Performance improvement of spread spectrum spatial-domain watermarking scheme through diversity and attack characterisation," IEEE Africon, pp. 293-298, 2002.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Kalker, T., et al., "System issues in digital image and video watermarking for copy protection," Proc. IEEE Int. Conf. on Multimedia Computing and Systems, pp. 562-567, Jun. 1999.
Kirovski, D., et al., "Multimedia content screening using a dual watermarking and fingerprinting system," Proceedings of the tenth ACM international conference, pp. 372-381, 2002.
Kirovski, D., et al., "Multimedia content screening using a dual watermarking and fingerprinting system," Multimedia '02 Proceedings of the tenth ACM international conference on Multimedia, 2002 (11 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
"ATSC—3.0 Automatic Content Recognition Watermarking Solutions," ATSC Technology Group, Advanced Television Systems Committee, Inc., Jan. 2014 (6 pages).
"ATSC Candidate Standard: Service Usage Reporting," ATSC Technology Group, Advanced Television Systems Committee, Inc., Dec. 2015 (15 pages).
"ATSC Candidate Standard: Content Recovery in Redistribution Scenarios," ATSC Technology Group, Advanced Television Systems Committee, Inc., Dec. 2015 (43 pages).
International Search Report and Written Opinion for PCT/US2017/028198, dated Aug. 8, 2017 (13 pages).

\* cited by examiner

*Table 1: Exemplary Service and Content Information Associated With Watermark Intervals*

| Watermark Information In Watermark Intervals | | Service And Content Associated With Watermark Intervals | | |
|---|---|---|---|---|
| Watermark symbol values | VP1 Payload | Service Presentation time in UTC | Service Identifier | Content Identifier | |
| W1 | P1 | 2015-11-05T00:00:00.0Z | SID1 | EIDR1 | ..... |
| W2 | P2 | 2015-11-05T00:00:01.5Z | SID1 | EIDR1 | ..... |
| W3 | P3 | 2015-11-05T00:00:03.0Z | SID1 | EIDR1 | ..... |
| W4 | P4 | 2015-11-05T00:00:04.5Z | SID1 | AD-ID1 | ..... |
| ... | ..... | ... | ... | ... | ..... |
| W21 | P21 | 2015-11-05T00:00:21.5Z | SID1 | AD-ID1 | ..... |
| W22 | P22 | 2015-11-05T00:00:23.0Z | SID1 | EIDR1 | ..... |
| ... | ..... | ... | ... | ... | ..... |
| W57599 | P57599 | 2015-11-05T23:59:58.5Z | SID1 | EIDR2 | ..... |
| W57600 | P57600 | 2015-11-05T24:00:00.0Z | SID1 | EIDR2 | ..... |
| W'1 | P'1 | 2015-11-05T00:00:00.0Z | SID2 | EIDR2 | ..... |
| W'2 | P'2 | 2015-11-05T00:00:01.5Z | SID2 | EIDR2 | ..... |
| W'3 | P'3 | 2015-11-05T00:00:03.0Z | SID2 | EIDR2 | ..... |
| W'4 | P'4 | 2015-11-05T00:00:04.5Z | SID2 | EIDR2 | ..... |
| W'5 | P'5 | 2015-11-05T00:00:06.0Z | SID2 | EIDR2 | ..... |
| ... | ..... | ... | ... | ... | ..... |
| W'1200 | P'1200 | 2015-11-05T00:30:00.0Z | SID2 | EIDR2 | ..... |
| ... | ..... | ... | ... | ... | ..... |
| W'57599 | P'57599 | 2015-11-05T23:59:58.5Z | SID2 | AD-ID2 | ..... |
| W'57600 | P'57600 | 2015-11-05T24:00:00.0Z | SID2 | AD-ID2 | ..... |

FIG. 5

SYSTEM AND METHOD FOR SIGNALING SECURITY AND DATABASE POPULATION

CROSS REFERENCE TO RELATED APPLICATIONS

This application is a continuation of U.S. patent application Ser. No. 16/094,456, filed on Oct. 17, 2018, which is a 371 application of International Patent Application No. PCT/US2017/028198, filed Apr. 18, 2017, which claims the benefit of priority of U.S. Provisional Patent Application No. 62/324,294, filed on Apr. 18, 2016, and U.S. Provisional Patent Application No. 62/367,018, filed on Jul. 26, 2016, the entire contents of which are incorporated by reference as part of the disclosure of this document.

TECHNICAL FIELD

The subject matter of this patent document relates to management of multimedia content and more specifically to managing and populating various metadata databases, as well as facilitating the acquisition of metadata associated with a content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

The metadata can enable content management, annotation, packaging, and search throughout content production and distribution value chain. Since the introduction of digital TVs, metadata has been introduced to enable digital interactive features and services. Various standardization efforts (such as MPEG-7, MPEG-21, TV-Anytime, DVB-SI, ATSC) strive to produce metadata standards with predefined data structures and transport methods for describing essence to support interoperability and unified services.

While such metadata may be useful in some applications, especially for enabling broadcast interactive services, they must be interleaved, prepended or appended to a multimedia content, which occupies additional bandwidth and, more importantly, can be lost when content is transformed into a different format (such as digital to analog conversion, transcoded into a different file format, etc.), processed (such as transcoding), and/or transmitted through a communication protocol/interface (such as HDMI, adaptive streaming).

BRIEF DESCRIPTION OF THE DRAWINGS

FIG. 5 illustrates an exemplary table for storing service and content information in accordance with an exemplary embodiment.

SUMMARY OF CERTAIN EMBODIMENTS

Figure 1:
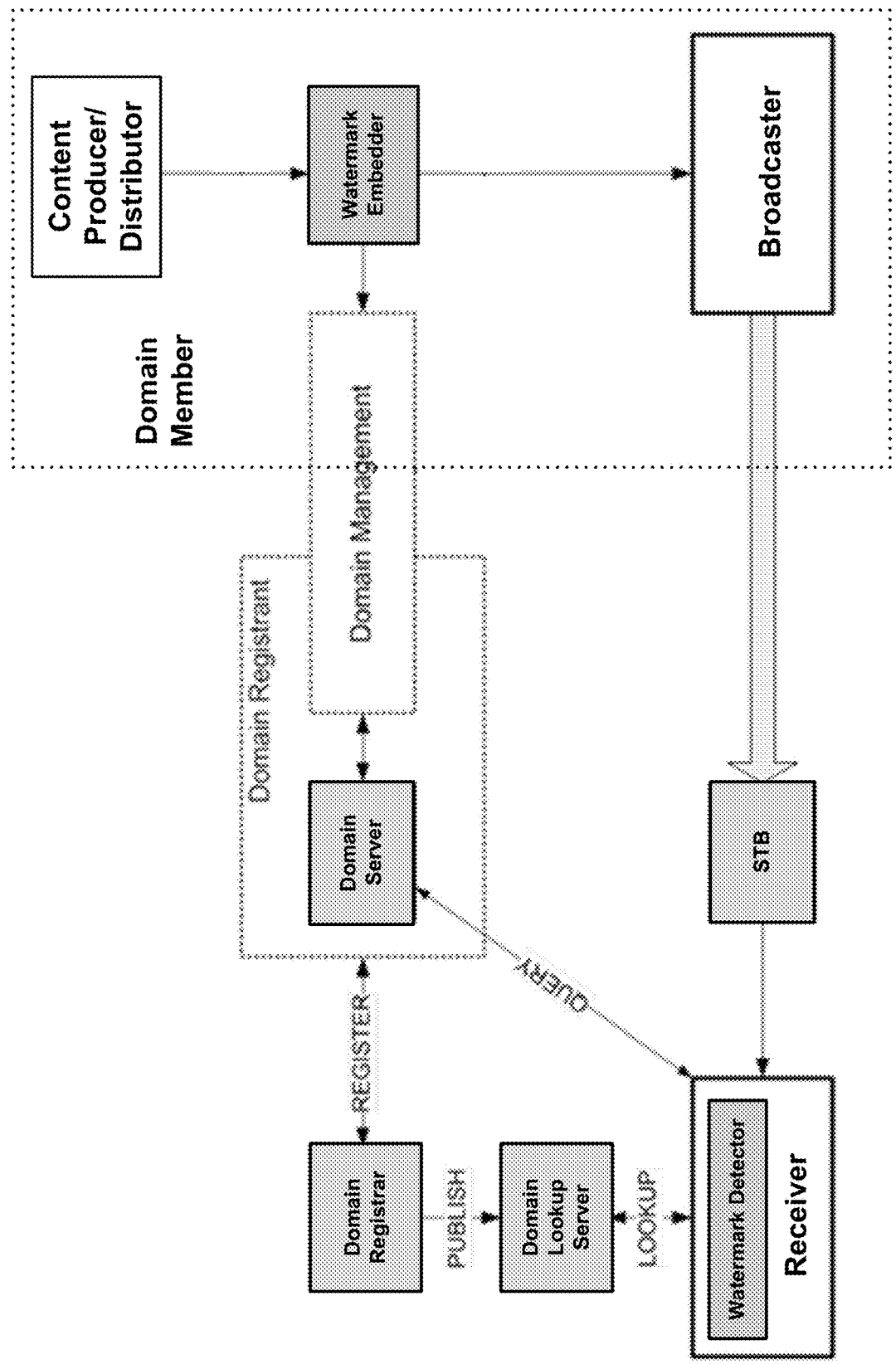
FIG. 1 illustrates a system for identifying a content that is provided by a broadcaster to a consumer device and for acquiring of various metadata including interactive content.

The disclosed technology relates to methods, devices, systems and computer program products that facilitate access to metadata associated with a content. The disclosed technology provides for secure and efficient access to information such as secondary content, metadata and advertisements associated with a content, allows population of metadata databases associated with the content, and prevents unauthorized access to such information.

One aspect of the disclosed technology relates to a method for facilitating access to metadata associated with a content, that includes receiving a multimedia content at a first receiver device that includes a first watermark extractor that is implemented at least partially in hardware, and (a) extracting a first watermark message from a first segment of the multimedia content using the first watermark extractor, (b) using at least a portion of the first watermark message to obtain additional information regarding the first segment of the multimedia content that includes the first watermark message, and (c) associating and storing one or more values of the first watermark message and the additional information. The method further includes repeating operations (a) to (c) to extract additional watermark messages from additional segments of the multimedia content and to form a table or array of items that can be accessed by specifying the one or more values of the first watermark message or one or more values of the additional watermark messages.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, metadata that is associated with a multimedia content can be lost or impaired during, for example, conversion of the multimedia content from a first format to a second format. To reduce or eliminate the need for interleaving or bundling the broadcast content with metadata that can be lost or removed, some systems utilize watermarking techniques to either carry the metadata as part of watermarks that are embedded into the essence of the content (i.e., they become part of the content itself as imperceptible signals) or use embedded watermarks to enable access to a remote server, from which metadata can be recovered. Advanced Television Systems Committee (ATSC), Inc., Call for Proposals For ATSC-3.0 AUTOMATIC CONTENT RECOGNITION WATERMARKING SOLUTIONS—ATSC Technology Group 3 ("ATSC 3.0") (S33 Doc. 067r3) provides guidelines for such a watermark-enabled broadcast system. ATSC 3.0 allows applications to run on a TV to provide interactive services, targeted advertising with local ad replacement, and audience measurement, video-on-demand, etc. based on detection of embedded watermarks from a content. Where such systems are deployed, there are particular concerns with authentication, integrity verification, and confidentiality of information that are sent and received to from various devices to and from the remote servers. Moreover, it becomes necessary to populate the remote servers with appropriate information in a secure and efficient manner.

FIG. 1 illustrates a system for identifying a content that is provided by a broadcaster to a consumer device and for acquiring of various metadata including interactive content. The system of FIG. 1 is compatible with the requirements of ATSC 3.0.

The content in FIG. 1 is embedded with watermarks by a Domain Member prior to broadcast. For example, such a Domain Member can be a content producer or a Broadcaster. A Broadcaster transmits the content to one or more user premises. Such content is often received at a receiver such as a set-top box (STB), where decompression and formatting operations may take place before the content is provided (typically via a HDMI interface) to a viewing device (sometimes referred to as the "Receiver" or the "Receiver Device"). Such a Receiver can be compliant with the ATSC 3.0 standard. Decompression and formatting may alternatively take place within the Receiver. The Receiver which includes a watermark detector, examines the received content for the presence of watermarks. Such a detector can obtain the embedded timecodes from the recovered watermarks to enable a determination of content interruptions, as well as metadata recovery in accordance with the disclosed embodiments. The Receiver also includes the processing components (e.g., microprocessors, FPGAs or other electronic circuitry and associated program code) to conduct fingerprint computations, as well as processing and analysis of a metadata streams or fields that may be received at the Receiver device). The Receiver can also be in communication with additional databases (not shown), such as fingerprint database, that allows exchange of computed fingerprints, metadata or other information.

It should be noted that while in some implementations, the Receiver is a separate component than the set-top box, in other implementations the Receiver may include, or be part of a larger device that includes, any one or combinations of additional components such as a set-top box, a display, keyboard or other user interface devices, or a watermark detector, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. The Domain Registrar in FIG. 1 is a unique centralized entity responsible for registering such Domain IDs and publishing the mapping between the Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar. Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. The use of a standardized LOOKUP protocol allows interoperability between any Receiver and any Domain Lookup Server. In some embodiments the Receivers are ATSC-compatible or ATSC-complaint. That is, those receivers comply with ATSC requirements, such as those under ATSC 3.0.

Domain Servers can be Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

Figure 2:
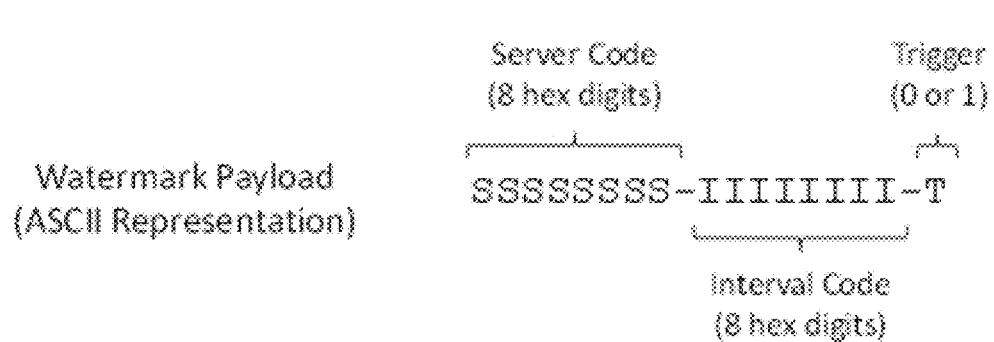
FIG. 2 illustrates an exemplary structure of a watermark payload structure.

In one example implementation, a 50-bit payload ("VP1" payload) can be embedded in every 1.5 seconds of the content. FIG. 2 shows an exemplary structure of a watermark payload. The payload can be mapped to, or represented by, a watermark code. The watermark payload can include at least the following components or fields: a server code, an interval code and a trigger field. The Server Code is a value which is registered with a central authority designated by a Server Registrar (e.g., ATSC) that provides a mechanism for dividing the watermark code space among independent code-issuing entities (e.g., Server Registrants). For example, a Server Code can be registered by a content producer that wants to manage and use codes within content that they produce, a network that wants to manage and use codes within content that they distribute, or a service provider that wants to manage interactive services on their behalf. These independent code-issuing entities are sometimes referred to as "ATSC Domains" because the Server Code can also provide a one-to-one mapping to an Internet domain. The domain identifiers are recorded by the Server Registrar, are published to Server Lookup Services which maintain copies of the registration database, and can be accessed by receivers to discover the Internet domain name at which they can access servers hosting metadata associated with content embedded with that Server Code.

The Server Registrant is responsible for coordinating the management of all Interval Codes associated with their assigned Server Code. Each Interval Code value can be associated uniquely with a specific interval of an instance of broadcast content. In some implementations, the interval is equal to the watermark duration (e.g., 1.5 seconds) but can be longer in circumstances where there is no need to enable a receiver to identify timing within the interval. The range of codes defined by an assigned Server Code and all associated Interval Codes is referred to as a Code Domain. The Trigger field of the VP1 watermark is a Boolean signal from the Content Source to the ATSC Receiver indicating that the ATSC Receiver should query for metadata or new interactive service content. In some implementations, a change in the value of the trigger field compared to previously detected trigger field is the indication that a query to a remote database can be, or should be, initiated to receive the metadata or the new content.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. As one example, a watermark may be formed that includes a 32-bit predetermined header and a 127-bit scrambled BCH (50,127,13) code. Once embedded into a host content, the host content can be disseminated through various channels and to ultimately reach a receiver. The received host content that includes embedded watermarks can be processed by a watermark extractor to recover the embedded watermark bits (or, more generally, symbols) by performing the reverse of the above coding, modulation or formatting schemes to recover the payload. In some instances, statistical techniques are used to recover the embedded symbols from the content using multiple instances of embedded watermarks.

Figure 3:
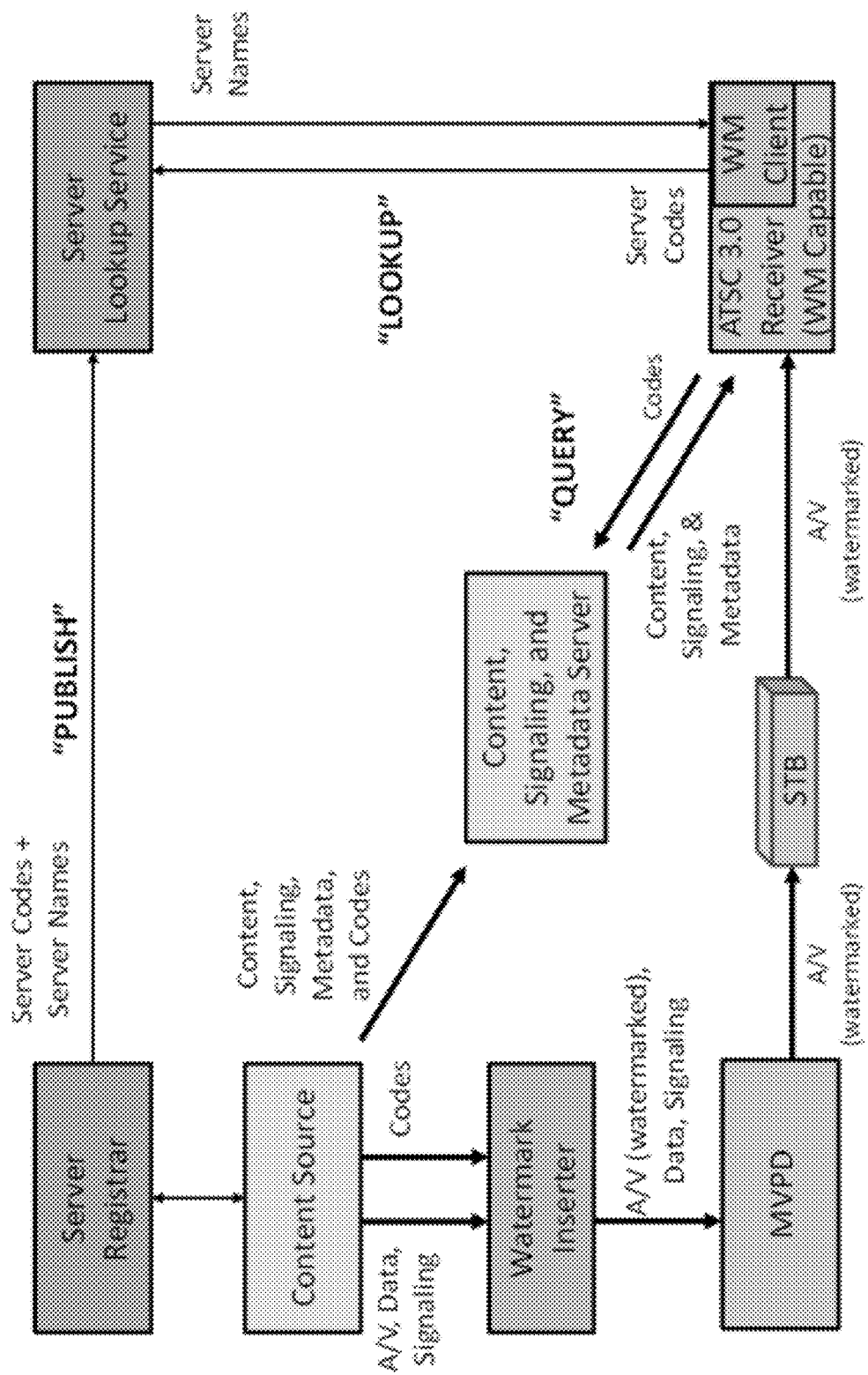
FIG. 3 illustrates another system for identifying a content that is provided by a broadcaster to a consumer device and for acquiring of various metadata including interactive content.

FIG. 3 also illustrates a system for identifying a content that is provided by a broadcaster to a consumer device and for acquiring of various metadata including interactive content. The system of FIG. 3 is compatible with the requirements of ATSC 3.0. Several components that are shown in FIG. 3 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 3 are further described below. A Server Registrar can be established for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Sever Code can be analogous to the Sequence ID described in the exemplary watermark payload above.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc. It should be noted that while metadata services can be hosted in the same servers as the content and signaling services, they may alternatively be hosted on different servers from those used for content and signaling services.

To enable the architecture that is depicted in FIG. 3, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

ATSC Receivers may obtain broadcast content essence absent the full ATSC broadcast stream from an MVPD via a STB. The ATSC receiver may provide the content essence to the watermark client for detection of any embedded codes. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

In some implementations, when the watermark client detects a watermark payload embedded in the content that it receives, it checks to determine whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc.

Figure 4:
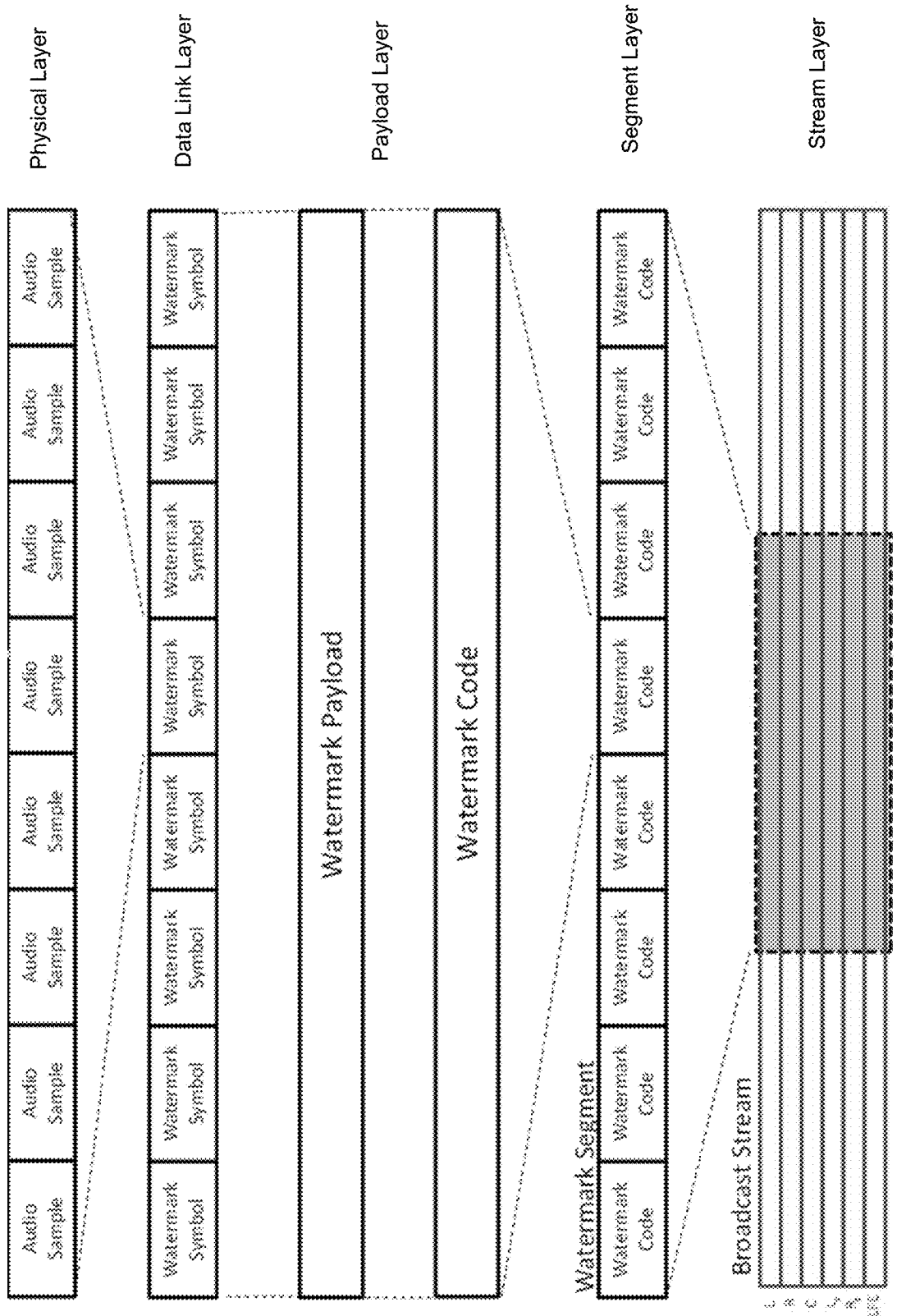
FIG. 4 illustrates an exemplary layering architecture associated with watermarks embedded in an audio component of a multimedia content.

Certain Aspects of an Exemplary Watermark Structure: The watermark structure and the associated architecture can be better understood using the exemplary layering architecture that is shown in FIG. 4 that assumes embedding of watermarks in audio component(s) of the multimedia content. The illustrated hierarchical watermark architecture includes a Stream Layer, a Segment Layer, a Payload Layer, a Data Link Layer and a Physical Layer. The smallest identifiable data at the physical layer is an audio sample at the physical layer; a specific number of audio samples host a watermark symbol at the Data Link Layer, and a specific number of watermark symbols form a watermark payload at the payload layer. FIG. 2 shows one example where each watermark payload can be mapped to a watermark code. Each watermark segment at the segment layer can include a plurality of watermark codes. The watermark segments can be embedded into one or more layers of the broadcast stream. For example, one or more channels of a 5.1 audio stream can have corresponding watermark codes embedded therein.

Each layer has an associated specification that describes how mapping from one layer to another layer is accomplished. Examples of the content of such specifications are provided below.

A Physical Layer specification defines the signal characteristics which map baseband audio samples representing broadcast audio in various formats (e.g. sampling rate, bit resolution) to a sequence of watermark symbols. This specification identifies the signal modulation and symbol encoding scheme for carriage of watermark data and, by implication, audio processing steps which may be employed for embedding, erasure, and detection of watermark symbols from audio signals. A Data Link Layer specification defines the symbol grammar that maps a sequence of watermark symbols to a valid watermark payload. This specification identifies the internal structure of a valid watermark, including the mechanisms employed in the watermark for facilitating synchronization, data transmission, control signaling, error correction, and error detection between a VP1 embedder and detector. A Payload Layer specification defines the data encoding that maps a watermark code to a watermark payload.

A Segment Layer specification defines the semantics used to arrange watermark codes within a watermark segment. A watermark segment is a continuously watermarked interval of a broadcast (which may or may not align with a broadcast segment such as a show, show segment, ad, or promo). The Segment Layer specification can, for example, specify how watermark codes (including the Server Code, Interval Code, and Trigger described earlier) relate to one another within and between watermark segments, including arrangements to ensure correct operation of triggers and interactive applications which are timecode synchronized and/or real-time. A Stream Layer specification defines the application of VP1 watermarks to one or more watermark segments in broadcast streams of various formats. This specifies how the watermark is employed across a range of audio environments, such as various audio channel count, sampling rate, bit resolution, encoding format, alternate audio, enhanced audio, and immersive audio configurations.

In the context of the hierarchical structure of FIG. 4, a receiver receives and processes the embedded content at the physical layer, and works it way up the hierarchical structure. In some embodiments, watermark information collected by receivers at different layers can be analyzed to obtain usage data to track or identify various user actions and content usage scenarios. Such usage data can, for example, include detection events reported by watermark detector based on the VP1 payloads and the change in successive VP1 payloads, and/or use case events indicating the content modifications identified by one or more detection events. For watermark payloads at any layer, an example mapping method is to build a database with the metadata needed to resolve the watermark information in a watermark interval into the usage in such interval. As described in further detail below, the watermark information in each watermark interval may be used as database keys for efficient search. Alternatively, the metadata database can be indexed using the original service time on the broadcast timeline.

Metadata database indexed with watermark information: The metadata associated with the watermark information in a watermark interval contains information needed to create a Consumption Data Unit (CDU), as specified by ATSC in ATSC Candidate Standard: Service Usage Reporting (see http://atsc.org/wp-content/uploads/2015/12/S33-170r1-Service-Usage-Reporting.pdf). It includes identification information for the broadcast services, channels, and content (ads and program). It may also contain content delivery methods, content destination (presented on the primary or second screen, or stored as time-shifted content), and broadcast applications and their life cycles.

FIG. 5 shows exemplary Table 1 at a database which stores the service and content information and associated watermark information. In Table 1, Wi and Pi (for $1 \leq i \leq 57600$) are the watermark symbol values and the VP1 payload in the $i^{th}$ watermark interval, respectively. The consecutive watermark intervals (i.e., 1.5-second intervals) from 1 to 57600 cover the 24-hour services of a first broadcaster. W'i and P'i (for $1 \leq i \leq 57600$) are the watermark symbol values and the VP1 payload in the $i^{th}$ watermark interval, respectively, that cover the 24-hour services of a second broadcaster. It should be noted that a watermark payload typically includes a plurality of watermark symbols (see, for example, FIG. 4). In this context, each of the entries Wi and W'i in Table 1 represents a plurality of watermark symbols that can correspond to a particular payload value. Referring back to Table 1, Service Presentation Time in UTC is the presentation time expressed in absolute UTC time value, especially for live broadcast. In one example, the Service Presentation Time in UTC for a DASH player is the sum of availabilityStartTime of the current MPD, the start time of the first period and the presentation time on Media Presentation timeline. SID1 and SID2 are the service identifiers of the first and second broadcast services, respectively. A service identifier can, for example, include a country code, a broadcast service ID assigned by an authority and service ID. EIDR1 and AD-ID1 are an Entertainment Identifier Registry (EIDR) number and an advertisement Identification (AD-ID) number that uniquely identify a program segment and an Advertisement of the first broadcast service, respectively. EIDR2 and AD-ID2 are an EIDR number and an AD-ID number that uniquely identify a program segment and an advertisement of the second broadcast service, respectively.

At least some of the information in Table 1 can be obtained using watermarks that are embedded in the content using a compliant receiver (e.g., a receiver that operates in compliance with the ATSC 3.0 specification and rules). For example, at the data link and payload layers, the watermark symbol values can be decoded to a data structure containing the VP1 payload. Moreover, detection events reported by watermark detector based on the VP1 payloads and the change in successive VP1 payloads can be used to populate the table at the metadata database.

Figure 6:
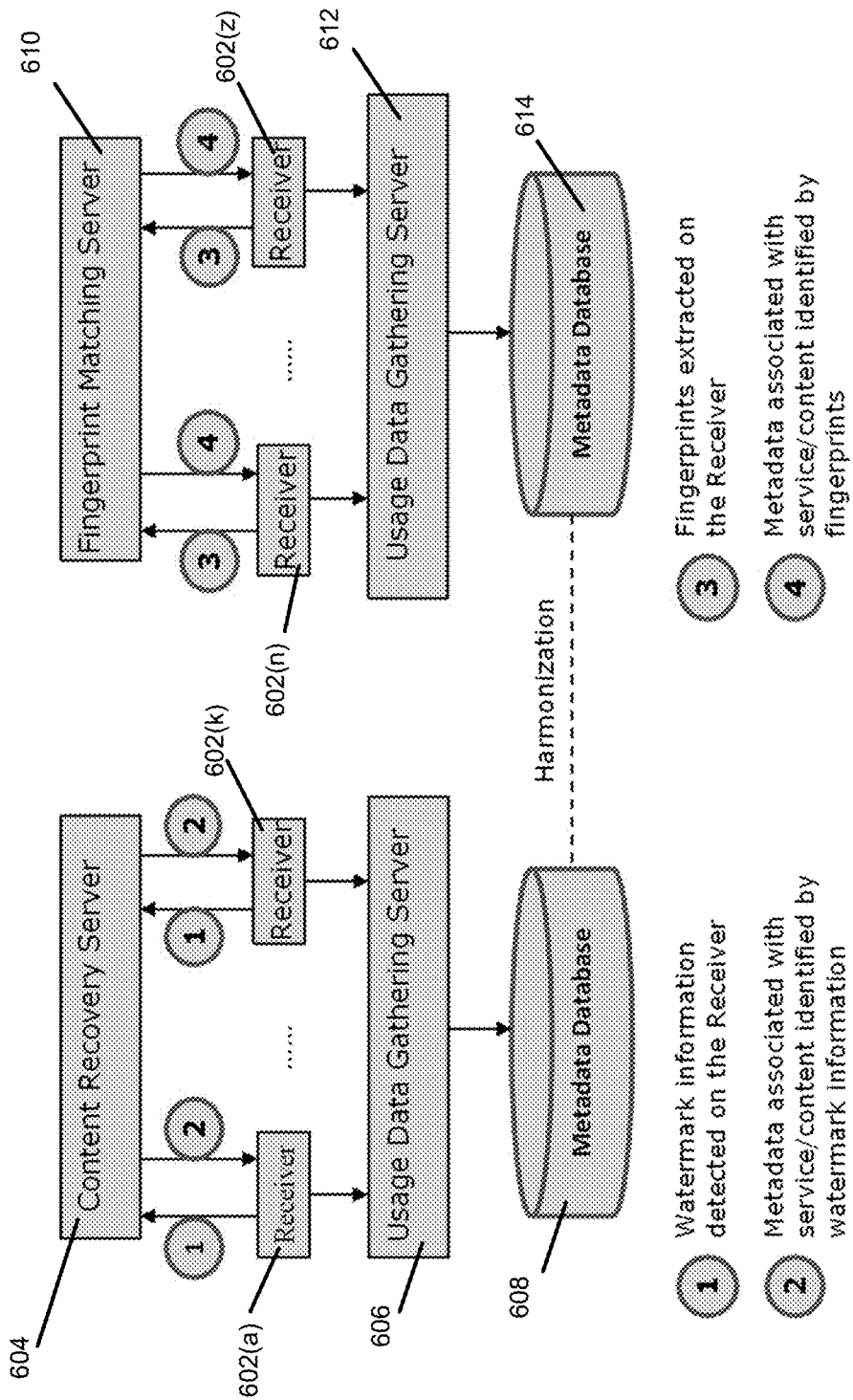
FIG. 6 is a block diagram illustrating two examples for populating a metadata database in accordance with the disclosed embodiments.

FIG. 6 is a block diagram illustrating two examples for populating a metadata database in accordance with the disclosed embodiments. For example, the configurations that are shown in FIG. 6 can populate at least part of the entries in Table 1. The left-hand side of FIG. 6 illustrates a watermark-based approach, in which one or more receivers 602(*a*) to 602(*k*) that receive multimedia contents (not shown), extract the embedded watermarks and send a request (illustrated in FIG. 6 as operations 1) to a content recovery server 604 to obtain metadata describing the service and content being viewed. The recovery server is, for example, an Internet server that provides signaling data to the receiver whose address is resolved using a VP1 Payload. The responses received (illustrated as operations 2 in FIG. 6) from the content recovery server 604 at the receivers 602(*a*) to 602(*k*) are used to populate the metadata database 608. A usage data gathering sever 606 is optionally provided to serve as an intermediate server to collect and organize the metadata received from the receivers 602(*a*) to 602(*k*), and identify usage scenarios and statistics, before providing the information to the metadata server 608.

The right-hand side of FIG. 6 illustrates a fingerprint-based approach, where one or more receivers 602(*n*) to 602(*z*), receive contents (not shown), compute fingerprints from the received content, and periodically or intermittently send (illustrated in FIG. 6 as operations 3) the generated fingerprints to a fingerprint matching server 610. The response (shown as operation 4 in FIG. 6) received from the fingerprint matching server 610 includes the information about the service and content possibly indexed by watermark information (or service time on the broadcast timeline). An optional data usage gathering server 612 receives the information from the receivers 602(*n*) to 602(*z*), organize the metadata and identifies usage scenarios and statistics, before providing the information to the metadata server 614.

In an exemplary case, all recovery files for each and all broadcast services can be obtained from the content recovery server 604 using a protocol such as the one specified in ATSC Candidate Standard: Content Recovery in Redistribution Scenarios (see http://atsc.org/wp-content/uploads/2016/03/S33-78r2-Content-Recovery-in-Redistribution- Scenarios.pdf). For example, assume that the server code in the large domain for a broadcaster service is 0x0000FF and the interval codes for 24-hour of such service starts at 0x00002D00 and ends at 0x00004380. The following queries can be constructed to retrieve all associated recovery files for the 24-hour service:

http://a336.00.00.FF.1.vp1.tv/a336/rdt/0000/FF/0000FF-000002D00 http://a336.00.00.FF.1.vp1.tv/a336/rdt/0000/FF/0000FF-000002D001 http://a336.00.00.FF.1.vp1.tv/a336/rdt/0000/FF/0000FF-000004380

The operations that are described in connection with FIG. 6, allow the metadata databases 608, 614 to be populated using watermark-based and/or fingerprint-based techniques. When databases 608, 614 are populated by both watermarks and fingerprints, data residing at those databases may be not congruous. Further harmonization between the databases help reduce redundancy and improve data accuracy. Examples of such incongruities include scenarios where the content interval associated with a watermark payload is not aligned with the content interval associated with each corresponding fingerprint (e.g., the two may have different boundaries or identification granularity), the watermark and the fingerprint are associated with different timelines or timing systems, the scenario in which the watermark is not detectable but a fingerprint match is obtained, or the watermark and the fingerprint are associated with different metadata.

It should be noted that while FIG. 6 shows two separate metadata databases 608 and 614, in some implementations a single database may be used. For example, a different subsection of the database may be designated for watermark-based and fingerprint-based data, respectively, which may be replaced and/or consolidated when the two sets of metadata are harmonized.

To prevent non-compliant devices, such as receivers made by rogue manufacturers, compromised receivers, or Internet robots installed on computers, from accessing the recovery server, various techniques can be employed such as client authentication using Transport Layer Security (TLS) with client certificates, and authentication token managed by broadcast application and validated by usage data gathering server. Some of these techniques are described in detail in further sections of this document. Without such countermeasures, a rogue or unlicensed entity can (legitimately) acquire one or more licensed receivers and use those receivers to obtain and store content information (such as the information provided in Table 1); such a rogue entity would then simultaneously deploy unauthorized receivers that are capable of detecting watermark messages, but instead of querying an official/authorized metadata database, would communicate with use the database that includes the stored information to acquire metadata, services and secondary content for a broadcast service. For example, as noted earlier, the recovery of watermark information at one or more layers (e.g., at the data link layer or the data recovery layer) can be used as an index to obtain such information.

Generation of usage data using watermark information and metadata database: In some embodiments, content usage information can be ascertained by extracting the embedded watermarks that are used to populate the metadata databases. For example, Tables 2 and 3 (below) show watermark information that is detected from two different receivers: Receiver A and Receiver B. Receiver A reports the watermark symbol values while Receiver B reports the VP1 payloads in accordance with the same convention described in connection with Table 1. The receiver wall clock time is represented in Coordinated Universal Time (UTC) and designates the start time of a watermark interval from which the watermark information is detected. A watermark interval (or VP1 Interval or cell) is an interval of content containing one or more VP1 Payloads with the same values

TABLE 2

Records of detected watermark information on Receiver A

| Watermark Symbol Values | Receiver Wall Clock Time |
|---|---|
| W1 | 2015-11-05T00:00:02.0Z |
| W2 | 2015-11-05T00:00:03.5Z |
| W3 | 2015-11-05T00:00:05.0Z |
| W'5 | 2015-11-05T00:00:08.0Z |
| . . . | . . . |
| W'1200 | 2015-11-05T00:30:02.0Z |

Based on the watermark information records in Table 2 and service/content information in Table 1, at least the following usage information can be generated for content consumed on Receiver A.

(1) The content having EIDR1 on the first broadcast service was consumed from 2015-11-05T00:00:00.0Z to 2015-11-05T00:00:04.5Z (i.e., for a duration of three 1.-second watermarks) on broadcast service timeline (i.e., Service Presentation time in UTC as identified in Table 1); and (2) the content having EIDR2 on the second broadcast service was consumed from 2015-11-05T00:00:08.0Z to 2015-11-05T00:30:02.0Z on broadcast service timeline.

TABLE 3

Records of detected watermark information on Receiver B

| VP1 Payload | Receiver wall clock time |
|---|---|
| P'1 | 2015-11-05T00:00:02.0Z |
| P'2 | 2015-11-05T00:00:03.5Z |
| P4 | 2015-11-05T00:00:08.0Z |
| . . . | . . . |
| P22 | 2015-11-06T24:00:32.0Z |

Based on the watermark information records in Table 3 and service/content information in Table 1, at least the following usage information can be generated for content consumed on Receiver B.

(1) The content having EIDR2 on the second broadcast service was consumed from 2015-11-05T00:00:00.0Z to 2015-11-05T00:00:03.0Z on broadcast service timeline; and (2) the content having AD-ID1 on the first broadcast service was consumed from 2015-11-05T00:00:08.0Z to 2015-11-05T00:00:30.0Z on broadcast service timeline.

Without certain countermeasures that are described later in this document, there is no viable technical solution to prevent rogue receiver manufacturers from making receivers without implementing VP1 protocol for usage monetization.

Metadata ascertained via watermarks for usage data of connected device: A connected device (e.g., a device that has connectivity via the Internet or another communication channel to other devices, databases or entities) such as a set-top-box or a media player on laptop can collect usage data for business intelligence and audience measurement. Such usage data usually contains raw viewing data without the associated metadata. The raw viewing data includes basic information such as a record of user selection of channels using a remote control, the start and end times of viewing in a channel and the like.

Using the disclosed techniques, a server that collects the raw viewing data from connected devices can associate the raw viewing data with associated metadata using a metadata database (as shown in Table 1) that is populated by information obtained from watermarks. The association may be performed by matching the viewing start and end times in the raw viewing data with the service presentation time in Table 1. For example, if the start and end times of viewing of a channel recorded on a connected device is D+2015-11-05T00:00:01.5Z and D+2015-11-05T00:00:03.0Z, respectively, the content identifier of such interval is EIDR1 and the service/channel identifier for such interval is SID1 according to Table 1. For live content, D is a known offset between the broadcast time and viewing time recording in the raw viewing data.

In an alternate embodiment, instead of associating metadata with raw viewing data at a server, a connected device can obtain metadata ascertained with watermarks (e.g., as shown in operation 2 of FIG. 6), and associate the metadata with the raw viewing data in the same way as the server does before sending the usage data to the server.

Combined uses of watermarks and fingerprints: Digital fingerprinting and watermarking are two methods for automatic content identification. Each method has its pros and cons. In a typical fingerprinting-based technique, the content is divided into segments and certain inherent characteristics of the content segments are computed. Examples of such content characteristics include content energy, content frequency features, temporal characteristics and others. The computed fingerprints are typically converted to, or mapped to, a compact form and indexed (e.g., through computation of a hash value) for storage in a database. When the content is subsequently disseminated and received at a receiver device, fingerprints are computed for the received content (e.g., on a segment-by-segment basis) and compared to the stored fingerprints to identify the content and/or detect any missing or altered content segments. For fingerprinting-based techniques, the content is not modified so legacy content (e.g., content that has been already distributed without embedded watermarks) and/or content that is otherwise intended to be released without embedded watermarks, can be identified. However, fingerprints cannot distinguish encoding versions, or the distribution path/source of the same content. Moreover, fingerprinting-based techniques require a large and scalable infrastructure that allows for a large number of clients to periodically query potentially very large fingerprint databases.

For watermarking method, different identifiers can be embedded into different copies of the same content so that the distribution encoding, path or source of the same content can be identified (in addition to the content identification). As watermark detection is performed on clients, no server infrastructure is required, which potentially results in lower latency in content identification than using fingerprint methods. However, the primary drawback is that watermarking requires modification of the content and thus legacy content that does not contain watermarks cannot be identified. In addition, watermark embedding introduces an extra process in content production and distribution workflow.

When various versions of the same broadcast content is watermarked and/or fingerprinted, combined and complementary uses of watermarks and fingerprints can improve performance of automatic content identification. When watermarked and fingerprinted broadcast content is distributed to a diversity of receivers, there are various scenarios where watermarks and fingerprints can be complementarily used for recovery of supplemental content including missing signaling data.

Using watermark information to trigger fingerprint matching: When a receiver is capable of watermark detection and fingerprint extraction, it can send a fingerprint query to a fingerprint server only when the detected watermarks identify a service change (such as channel change, content component change, tune-in) or indicate that a new signaling data, such as a dynamic event (e.g., an advertisement, a secondary content, etc.) is available. Using this technique, it is not necessary to compute and send fingerprints periodically to the fingerprint server, but such requests are sent more selectively only upon detection of the appropriate triggering events identified by the extracted watermarks. If the metadata information about the service and content is directly embedded in the watermarks, a service change can be identified if the service identification changes. If the metadata is obtained from a remote recovery server (e.g., the Content Recovery Server 604 in FIG. 6) using the detected watermark information, service change can be identified when discontinuity in watermark information is detected.

One of the advantages of using the combined watermarking and fingerprinting techniques is that the cost for operating the fingerprint server can be reduced using the watermarking information to trigger the fingerprint queries. As described earlier, the watermark information discontinuity can be detected at different layers, such as the physical layer, data link layer, watermark payload layer, or detection event layers.

Populating the fingerprint database using metadata ascertained via watermarks: When a receiver is capable of watermark detection and fingerprint extraction, the watermark can be used to populate the fingerprint database to enable receivers that do no have watermark detection capability to obtain the metadata.

Figure 7:
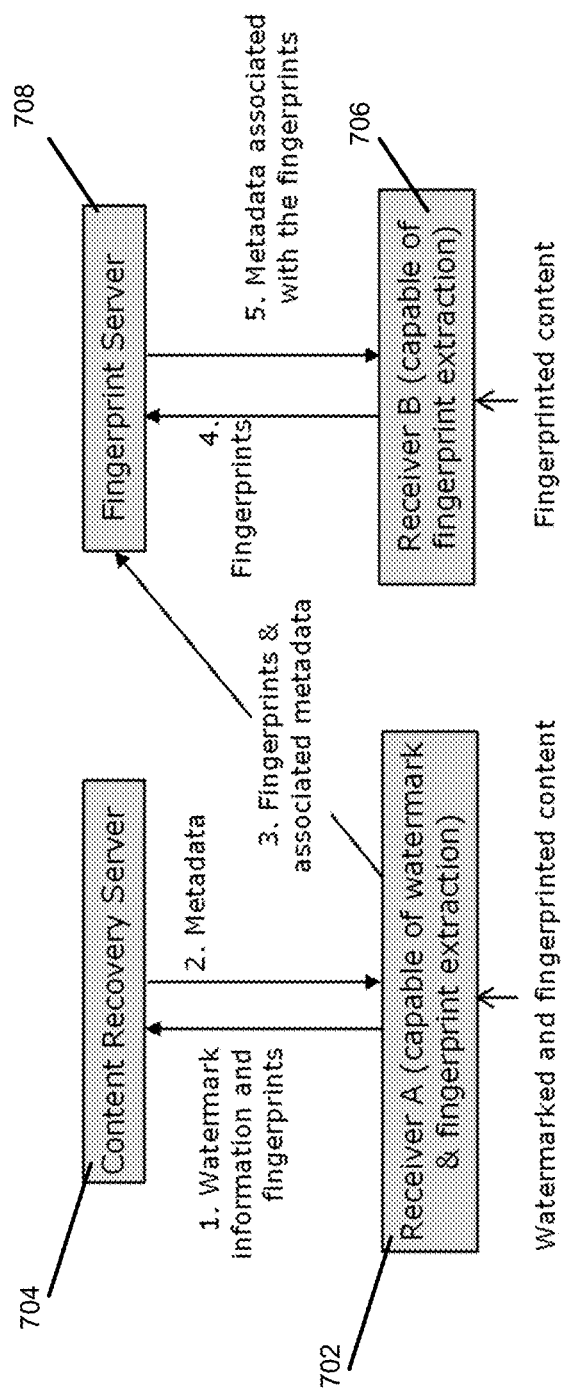
FIG. 7 is a block diagram illustrating how population of a fingerprinting database can be facilitated using the extracted watermarks in accordance with an exemplary embodiment.

FIG. 7 is a block diagram illustrating how population of a fingerprinting database can be facilitated using the extracted watermarks in accordance with an exemplary embodiment. As shown in FIG. 7, the Receiver A 702 includes components that can perform watermark extraction and also components that can generate fingerprints from a received content. Receiver A detects the watermarks from a content interval and also extracts the fingerprint from the same interval. The watermark information is used to construct a query (illustrated at operation 1 in FIG. 7) to a recovery server 704 for the metadata associated with the watermark. Receiver A 702 then receives (illustrated at operation 2) the metadata from the recovery server 704, and sends (illustrated as operation 3) the metadata together with the fingerprints extracted from the content interval (and optionally the watermark information obtained from the extracted watermarks) to a fingerprint server 708 where the fingerprints (and optionally the watermark information) and associated metadata are stored in the fingerprint database on the fingerprint server 708. In some implementations where the metadata corresponding to the service and content is directly carried in the watermarks, the first and second steps (operations 1 and 2 in FIG. 7) can be skipped.

In the exemplary configuration of FIG. 7, Receiver B 706 includes components that can generate fingerprints from a content. The fingerprint information is used to construct and send a query (operation 4 in FIG. 7) to the fingerprint server 708 to obtain the metadata that had been fully or partially obtained via watermarks detected by Receiver A 702, as previously described.

It should be noted that in the exemplary configuration of FIG. 7, the content that is input to Receiver A is labeled "Watermarked and fingerprinted content" to covey that such content includes embedded watermarks and has previously been processed to produce associated fingerprints for storage at a fingerprint database. Similarly, the content that is input to Receiver B is labeled "Fingerprinted content" to covey that such content has previously been processed to produce associated fingerprints for storage at a fingerprint database.

Figure 8:
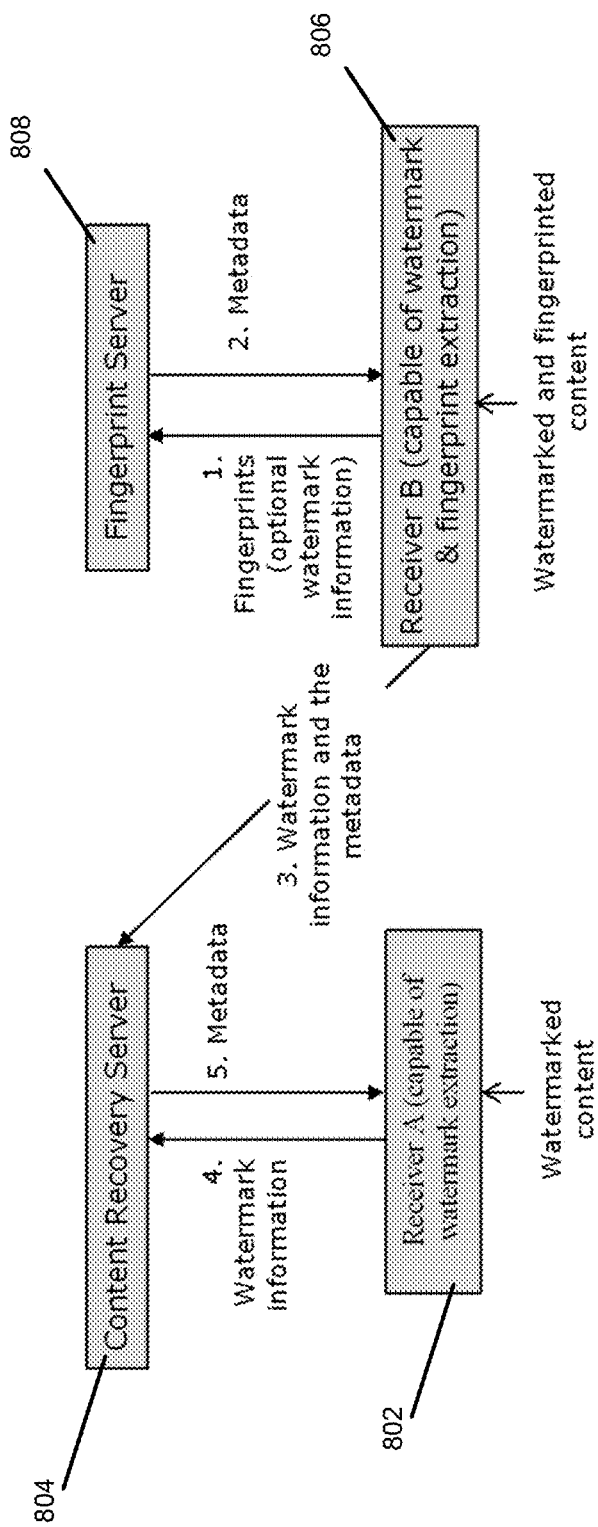
FIG. 8 is a block diagram illustrating how population of data recovery files can be facilitated using metadata obtained via fingerprints in accordance with an exemplary embodiment.

Population of recovery files using metadata ascertained via fingerprints: FIG. 8 is a block diagram illustrating how population of data recovery files can be facilitated using metadata obtained via fingerprints in accordance with an exemplary embodiment. As shown in FIG. 8, Receiver B 806 has the capability of both watermark extraction and fingerprint extraction. It first extracts the fingerprints from a content interval and constructs and sends a query (operation 1) using the extracted fingerprints to a fingerprint server 808 that performs fingerprint matching. Receiver B 806 may optionally include the watermark information as part of the query. If a match is found, the fingerprint server 808 provides the metadata associated with the fingerprint as the response (operation 2).

Once Receiver B 806 receives the metadata associated with the interval from the fingerprint server 808, it sends (operation 3) such metadata together with the watermark information detected from the content interval to a recovery file production server (not explicitly shown). The recovery file production server then uses the received metadata to create one or more recovery files associated with the content interval, and makes these recovery files available on a content recovery server 804. In some implementations, the functionalities associated with such a recovery file production server may be implemented on the content recovery server 806. Once the recovery files are available, Receiver A 802 with capabilities of watermark extraction and content recovery can extract embedded watermarks from a received watermarked content, construct and send a watermark-based query (operation 4 in FIG. 8) to the content recovery server 804 and obtain the recovery files containing the metadata (operation 5).

Retrieval of additional metadata using metadata ascertained via fingerprints or watermarks: In some embodiments, two different sets of metadata may be obtained through watermarks and/or fingerprints. The steps to obtain such metadata can be performed in parallel and asynchronously, or sequentially.

Figure 9:
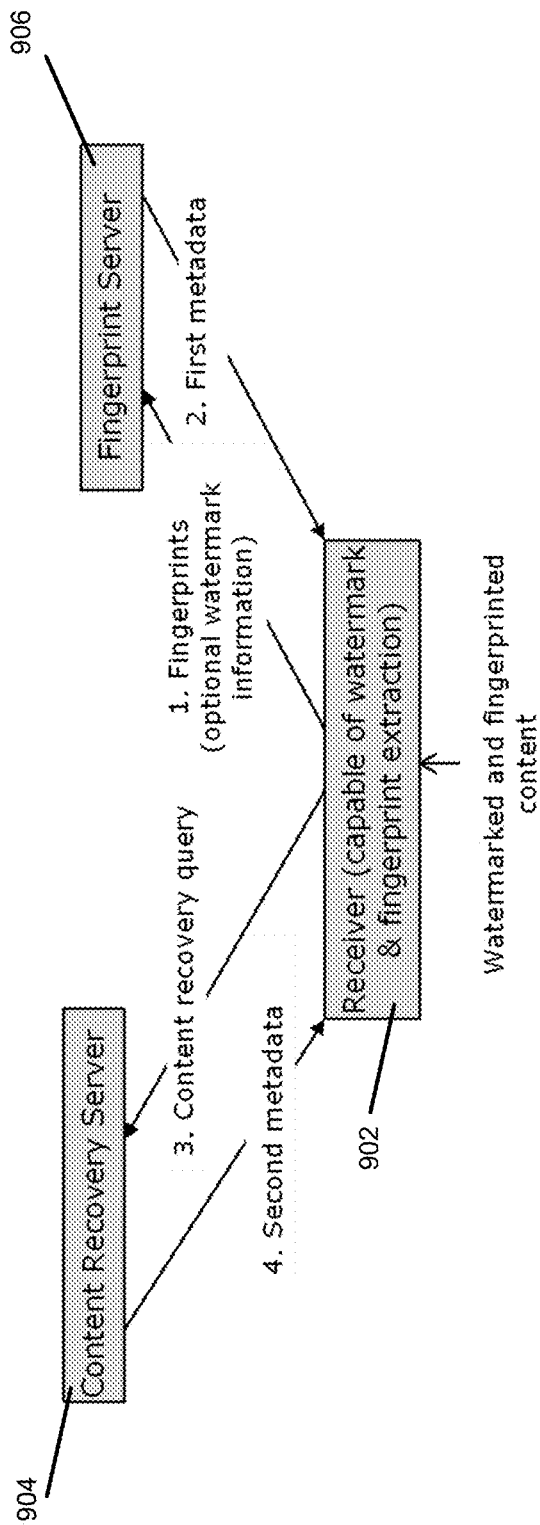
FIG. 9 is a block diagram illustrating how retrieval of additional metadata can be facilitated using fingerprints and watermarks in accordance with an exemplary embodiment.

FIG. 9 is a block diagram illustrating how retrieval of additional metadata can be facilitated using fingerprints and watermarks in accordance with an exemplary embodiment. In the configuration of FIG. 9, retrieval of a second metadata is facilitated using a first metadata that is ascertained via fingerprints. As shown in FIG. 9, Receiver 902 includes components capable of extracting watermarks and generating fingerprints from the received content. In operation 1, fingerprints that are generated by Receiver 902 are used to form a query to the fingerprint server 906. The query can optionally include watermark information obtained from the content. In operation 2, the first metadata associated with a content interval is obtained from the fingerprint server 906 based on fingerprint information sent in the query. The first metadata may contain information regarding how to access the second metadata such as a URL of the server that hosts the second metadata. In operation 3, Receiver 902 uses the first metadata and/or the detected watermark information to construct and send a content recovery query to a content recovery server 904. The content recovery server 904, at operation 4, provides the second metadata associated with the same content interval to Receiver 902. The first and second metadata may contain the same or different information about the content interval.

Figure 10:
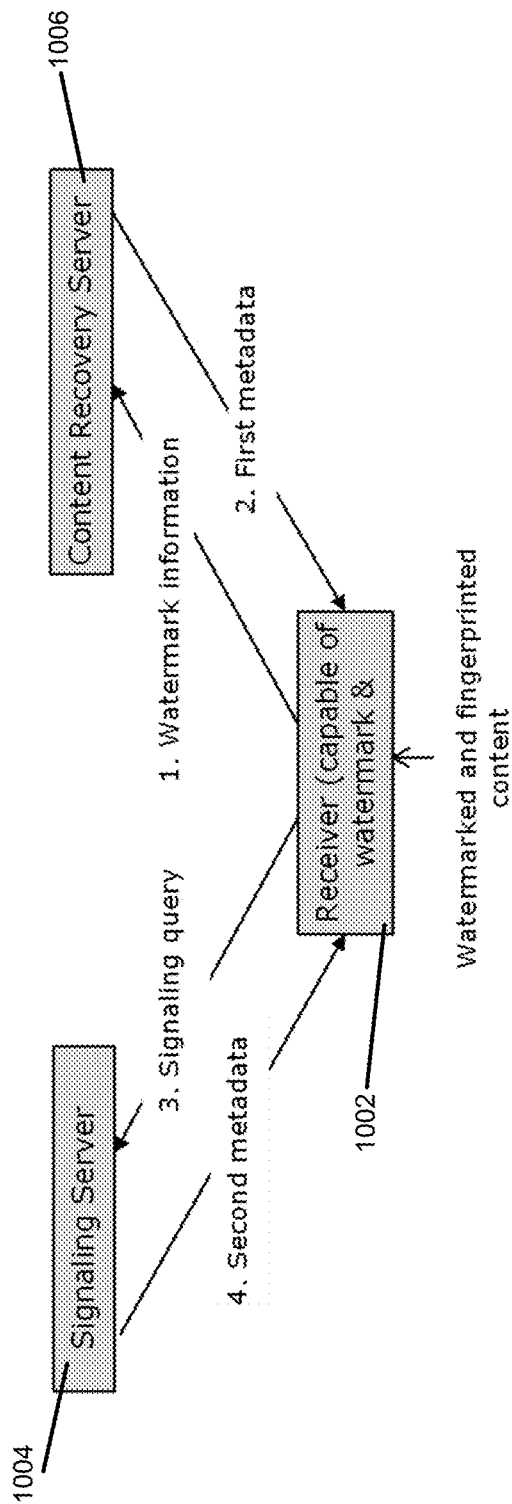
FIG. 10 is a block diagram illustrating how retrieval of additional metadata can be facilitated using fingerprints and watermarks in accordance with an exemplary embodiment.

FIG. 10 is a block diagram illustrating how retrieval of additional metadata can be facilitated using fingerprints and watermarks in accordance with another exemplary embodiment. In the configuration of FIG. 10, retrieval of a second metadata is facilitated using a first metadata that is ascertained via watermarks. As shown in FIG. 10, Receiver 1002 extracts watermarks from a received content, forms and sends a query (operation 1) to a content recovery server 1006. In response, the content recovery server 1006 sends the first metadata (in operation 2) associated with a content interval to Receiver 1002. The first metadata may contain information about how to access the second metadata such as a URL of the signaling server that hosts the second metadata. At operation 3, Receiver 1002 uses the received first metadata and/or the detected watermark information to construct and send (operation 3) a signaling query to a signaling server 1004. In response, the signaling server 1004 sends (at operation 4) the second metadata to Receiver 1002. The first and second metadata may contain the same or different information about the content interval.

In some implementations, the signaling server 1004 can be a fingerprint server. In this case, the fingerprints extracted from the content interval associated with the first metadata may optionally be used to construct the signaling query. In embodiments where the first metadata is directly carried in the watermarks, operations 1 and 2 in FIG. 10 can be skipped. The signaling query can be constructed using the information including the first metadata carried in the watermarks.

Embedding additional watermarks using the metadata ascertained via fingerprints or watermarks: In some embodiments, additional watermark information can be embedded into the content interval using the metadata that is associated the same interval and ascertained via the first watermarks that are already present in the content.

Figure 11:
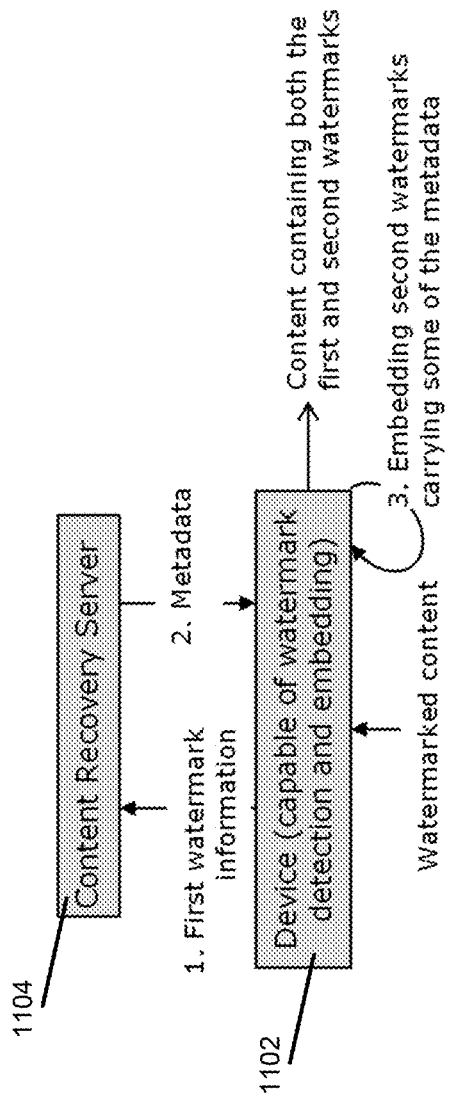
FIG. 11 is a block diagram illustrating how embedding of a second set of watermarks can be facilitated using information obtained from a first set of watermarks in accordance with an exemplary embodiment.

FIG. 11 is a block diagram illustrating how embedding of a second set of watermarks can be facilitated using information obtained from a first set of watermarks in accordance with another exemplary embodiment. In the exemplary operations depicted in FIG. 11, a device 1102 detects the watermark information carried in a first set of watermarks that are embedded in the content. The device 1102 uses such watermark information to construct and send a query (operation 1) to a content recovery server 1104, and in response receives (operation 2) metadata associated with the first set of watermarks from the content recovery server 1104. The device 1102 then embeds (operation 3) the second set of watermarks carrying some parts of the metadata such as content identifiers (e.g., EIDR and AD-ID) and/or the start and end times of the content interval associated with the metadata on the broadcast timeline. The second set of watermarks may also carry the information that identifies the distributor such as a broadcast network, a local broadcast station, a syndicator, a MVPD, a OTT provider, and the like.

In some embodiments, the first and second set of watermarks are embedded using different watermarking technologies. The device 1102 can be a consumer device such as a set-top-box or a device that is used in content production or distribution system such as a transcoder and headend, and includes components that are capable of watermark detection and embedding. In embodiments that metadata is directly carried in the first set of watermarks, operations 1 and 2 in FIG. 11 may be skipped.

Figure 12:
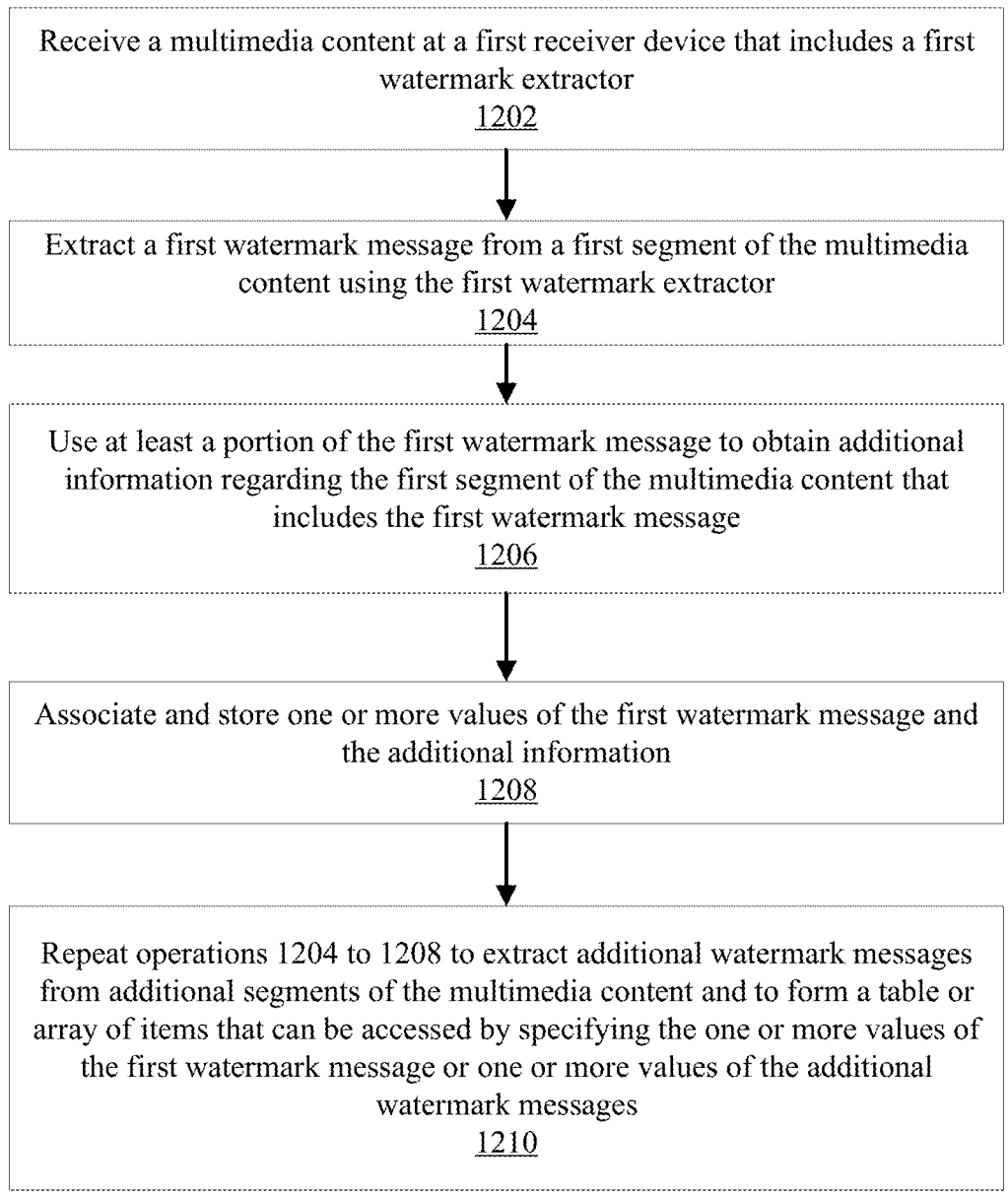
FIG. 12 illustrates a set of operations that can be carried out to facilitate access to metadata associated with a content in accordance with an exemplary embodiment.

FIG. 12 illustrates a set of operations that can be carried out to facilitate access to metadata associated with a content in accordance with an exemplary embodiment. At 1202, a multimedia content is received at a first receiver device that includes a first watermark extractor. The first watermark extractor can be implemented at least partially in hardware. At 1204, a first watermark message is extracted from a first segment of the multimedia content using the first watermark extractor. At 1206, at least a portion of the first watermark message is used to obtain additional information regarding the first segment of the multimedia content that includes the first watermark message. At 1208, one or more values of the first watermark message are associated the additional information and stored. At 1210, operations 1204 to 1208 are repeated to extract additional watermark messages from additional segments of the multimedia content and to form a table or array of items that can be accessed by specifying the one or more values of the first watermark message or one or more values of the additional watermark messages.

In one exemplary embodiment, for each of the extracted watermark messages, the additional information includes one or more of the following: a service identifier associated with the corresponding segment of the multimedia content; a program identifier associated with the corresponding segment of the multimedia content; or a service presentation time that represents a time frame within which the corresponding segment of the multimedia content is presented. In another exemplary embodiment, using at least a portion of the first or the additional watermark messages to obtain the additional information includes forming a query for each of the first and the additional watermark messages to obtain the additional information from a metadata sever, wherein each query includes a sever code and an interval code obtained from the corresponding watermark message.

According to another exemplary embodiment, associating the one or more values of the first watermark message and the additional information includes one or both of: associating a watermark payload value with the additional information, or associating a plurality of watermark symbol values with the additional information. In yet another exemplary embodiment, wherein specification of one or both of the watermark payload value or the plurality of watermark symbol values enables access to the corresponding additional information from the table or array of items.

In another exemplary embodiment, the above noted method further includes receiving the multimedia content at a second receiver device that includes a second watermark extractor that is implemented at least partially in hardware, extracting the first watermark message and one or more of the additional watermark messages from the multimedia content using the second watermark extractor, and transmitting, for each of the extracted watermark messages, information including a payload value of the watermark message and a time value to a database, wherein the transmitted information in conjunction with the table or array of items enables a determination of a particular usage of the multimedia content. Such a time value can be local time value to the second watermark extractor. Further, this time value can be in different timing system, e.g., ATSC system time delivered in physical layer (i.e. broadcast service time), wall clock time of the receiver, the presentation time of content, expressed in UTC or NTP, etc.

In another exemplary embodiment, the above noted method further includes receiving the multimedia content at a second receiver device that includes a second watermark extractor that is implemented at least partially in hardware, extracting the first watermark message and one or more of the additional watermark messages from the multimedia content using the second watermark extractor, and transmitting, for each of the extracted watermark messages, information including a plurality of symbols values of the watermark message and a time value at the second watermark extractor to a database, wherein the transmitted information in conjunction with the table or array of items enables a determination of a particular usage of the multimedia content. In the above noted scenarios, the particular usage of the multimedia content includes one or more of the following: (A) consumption duration of the multimedia content, (B) an identifier of the multimedia content, (C) a type of multimedia content that was consumed, or (D) a change in the multimedia content.

In one exemplary embodiment, each of the extracted watermarks is extracted from an audio component of the multimedia content that is 1.5 seconds in duration. In another exemplary embodiment, the additional information is obtained by receiving a recovery data table from a recovery server located remotely from the first receiver device.

Figure 13:
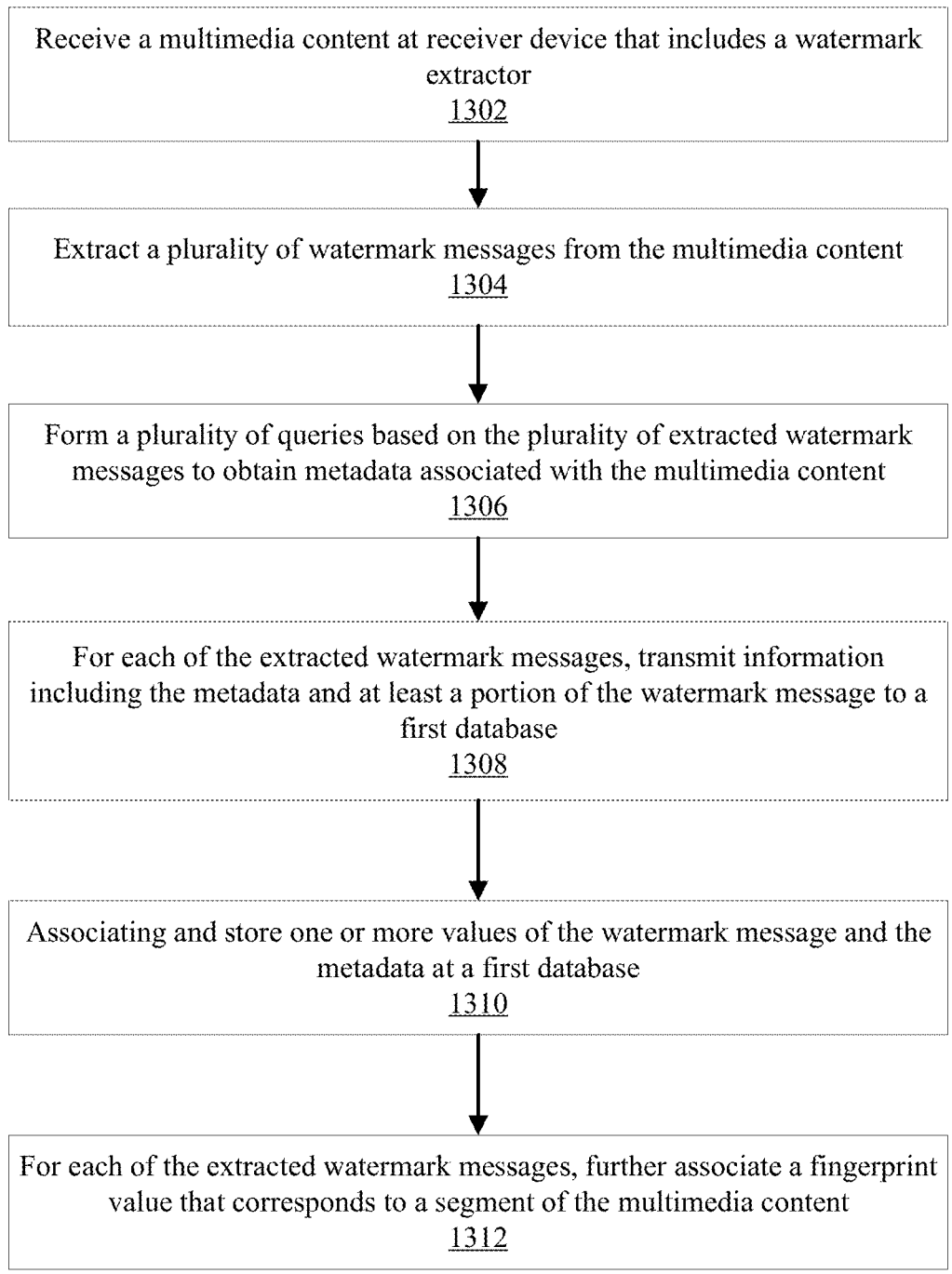
FIG. 13 illustrates a set of operations that can be carried out to populate a database of information based on information obtained from a broadcast multimedia content in accordance with an exemplary embodiment.

FIG. 13 illustrates a set of operations that can be carried out to populate a database of information based on information obtained from a broadcast multimedia content in accordance with an exemplary embodiment. At 1302, a multimedia content at receiver device that includes a watermark extractor. Such a watermark extractor can be implemented at least partially in hardware that include electronic circuitry. At 1304, a plurality of watermark messages are extracted from the multimedia content. At 1306, a plurality of queries are formed based on the plurality of extracted watermark messages to obtain metadata associated with the multimedia content. At 1308, for each of the extracted watermark messages, information including the metadata and at least a portion of the watermark message is transmitted to a first database. At 1310, one or more values of the watermark message is associated with the metadata and stored at a first database. At 1312, for each of the extracted watermark messages, a fingerprint value is further associated with the watermark message that corresponds to a segment of the multimedia content.

In one exemplary embodiment, the fingerprint value corresponds to a segment of the multimedia content that is time-aligned with a segment of the multimedia content that includes the corresponding watermark message. In another exemplary embodiment, the metadata associated with each watermark message at the first database is accessible by specification of one or more of the following: a payload value of the watermark message, a plurality of symbol values of the watermark message, or the fingerprint value that corresponds to the corresponding segment of the multimedia content. In yet another exemplary embodiment, the above noted method further includes associating the watermark message and the metadata with fingerprint-based metadata associated with each fingerprint value. In one embodiment, the fingerprint values and the associated fingerprint-based metadata reside at a second database that is in communication with the first database. In another embodiment, the fingerprint values and the associated fingerprint-based metadata reside at the first database.

In another exemplary embodiment, metadata stored at the first database includes timing information associated with each of the watermark messages to the first database. In one exemplary embodiment, the above noted method further includes determining a particular usage of the multimedia content based on information residing at the first database. Such a usage can include consumption duration of the multimedia content, an identifier of the multimedia content, a type of multimedia content that was consumed, or a change in the multimedia content.

Another exemplary embodiment relates to a method that can be carried out at a packager in broadcast production. Such a method includes embedding a watermark message that includes a VP1 payload, comprising a server code and an interval code in a content segment. The method further includes generating a fingerprint for the same content segment, and associating the server code with the fingerprint. For example, the server code can be used as an identifier or index to access the fingerprint information. The above noted method can also optionally include using the server code by a receiver to retrieve metadata from the fingerprint database.

ATSC 3.0 Signaling Security Evaluation and Solutions: In the sections that follow security threats to ATSC 3.0 signaling data are described, and methods and systems to mitigate or thwart those security threats are presented.

Target of Evaluation (TOE): The Target of Evaluation (TOE) in the sections that follow is described in the context of ATSC 3.0 receiver software functions running on any operating system or platform and used primarily to acquire, deliver and process ATSC signaling. It is understood, however, that various functions can be implemented using hardware, software, or a combination of both.

A broadcast application, in some examples, is defined as a collection of HTML5 documents consisting of HTML pages, JavaScript, CSS, XML and multimedia files. The collection of these files can be packaged as one compressed file. It is assumed that these pages and resources are then made available via the local web server to the browser in the receiver. The interface between broadcast application and the receiver device allows the application to access resources of the receiver and provide data exchange between them. The signaling interface is responsible for collecting the service/application signaling and managing the updates to the service/application. Service/application signaling arrives over the broadcast delivery network, in video watermarks, or delivered through broadband servers (i.e., the Recovery Server and other internet server) bootstrapped by broadcast streams via OTA (Over-The-Air) or audio and/or video watermarks.

Security Threats

T.EAVESDROP—Network Eavesdropping: A network eavesdropping scenario involves an attacker positioning himself on the network in order to monitor transmissions between the system and the intended destination of some potentially sensitive data. With respect to receivers, this includes monitoring the data exchanges: (1) between a Recovery Server and Watermark Client in the receiver; (2) between a Signaling Server and signaling interface in the receiver; and/or (3) between the broadcast application and the receiver. It should be noted that part of the header in this subjection (T.EAVESDROP) is written in a commonly used format in security analysis.

By monitoring the data exchange in the above communications, an attacker (or its application) can collect usage information that can amount to privacy violation, can be used for determination of advertisement periods for automating ad skipping as described in later in this document, and for other unintended behaviors.

Collusion Attack: In a collusion attack scenario, an attacker collects multiple versions of the content containing DASH periods resulted from a single public Xlink resolution in an MPD for a broadcast service from multiple receivers that may be located in different locations. A targeted ad period can be identified if a period has different source identifiers (identifying the different segments) in these versions. This attack may take place at either of the following communications: (1) between the broadcast application and external signaling server during Xlink resolving process; and/or (2) between the broadcast application runtime environment and the receiver. This attack would allow the attacker to program the recording schedule on a receiver to skip the ad periods at real-time.

T.NETWORK Network Attack: In a network attack scenario, an attacker is positioned on a communications channel or elsewhere on the network infrastructure. Network attack is similar to network eavesdropping in that it includes an attacker positioning him/herself on the network. It differs from network eavesdropping in that it involves the attacker initiating communications with the target system, or modifying data between the target system and the data's legitimate destination. When the broadcast application runs on a separate device from the receiver (e.g., via a home network), network attacks can occur within network (e.g., home network). Instead of attacking the whole Internet, the attacker instead mounts his attacks on the networked devices.

MITM (Man-In-The-Middle) Attack: MTIM is a type of Network Attack in which the attacker secretly relays and possibly alters the communication between a client and a server. Both the client and the server believe they are directly communicating with each other.

With respect to ATSC 3.0 receiver, a MTIM attack scenario can take place as part of the following exemplary client-server communications: (1) sending malicious recovery data table (RDT) to the Watermark Client in the receiver or modifying the information en route to a recovery server; (2) sending malicious applications or signaling files to signaling interface or modifying the information en route to a Signaling Server; (3) other non-ATSC applications (e.g., generic Linux applications) in the receiver sending malicious signaling files or application updates to broadcast applications; and/or (4) applications running on other computers within the same home network sending malicious signaling files or application updates to broadcast applications.

By delivering malicious signaling and/or applications (and their updates) to the ATSC 3.0 receiver, an attacker can completely hijack the receiver as the broadcast application has broad control on the screen of the receiver such as selection services and content presentation.

DNS Poisoning: Domain Name System (DNS) Poisoning is a type of Network Attack that targets at the DNS infrastructure. In one DNS poisoning attack, data is introduced into a DNS resolver's cache by attackers, causing the name server to return an incorrect IP address, diverting traffic to the attacker's computer (or any other computer). In one example, the IP address DNS entries for a target website on a given DNS server is spoofed and replaced with the IP address of a server under attacker's control. In another example attack, the nameserver of the attacker's domain is redirected to the nameserver of the target domain, and then that nameserver is assigned an IP address specified by the attacker. In yet another example attack, the nameserver of another domain unrelated to the original request is redirected to an IP address specified by the attacker.

Signaling Server DNS Poisoning: with respect to ATSC 3.0, a specific DNS Poisoning attack is to forge ATSC 3.0 bootstrap URIs including URLs for signaling server, electronic service guide (ESG) server, and Usage Reporting server. In ATSC 3.0, such bootstrap URIs can be delivered via OTA, broadband servers, or audio and/or video watermarks. For example, bootstrap URIs is delivered as URI Message in video watermark, bootstrap URIs is delivered in the svcInetUrl field of the service list table (SLT) table over OTA, and/or bootstrap URIs is delivered in the svcInetUrl field of the RDT through the VP1 Payload. SLT is a low-level signaling information which is used to build a basic broadcast service listing and provide bootstrap discovery of service signaling information.

This attack is generally applicable to signaling delivery by Internet servers, and may result in resolving a server code or URL into an error (e.g., no resolution), an address of an unauthorized signaling server, or non-existing server address. It can at least disable the supplemental content provided by ATSC 3.0.

T.SAMEORIGIN VIOLATION: An origin is defined as a combination of URI scheme, hostname, and port number. The same-origin policy is an important concept in the web application security model. Under the policy, a web browser permits scripts contained in a first web page to access data in a second web page, but only if both web pages have the same origin. Violating the same-origin policy can be considered as a specialized type of network attack which involves web content violating access control policies enforced by a web browser to separate the content of different web domains. It is specifically identified as a threat to web browsers, since they implement the access control policies that are violated in these attacks.

A possible solution is to add a URL for the broadcast application's starting page (e.g., index.html) into Service Layer Signaling (SLS) table. The scheme, hostname and the port number of the URL becomes the origin of the broadcast application.

Note that the URL of the signaling server where the receiver can obtain such SLS is the signaling server URL, one of three bootstrap URIs in the bootstrap signaling carried in broadcast stream OTA (as SLT), in URI Message in video watermark, or in RDT enabled by VP1 Payload. This is the assumption used to evaluate the threats of the same origin violation.

Session Hijacking: This is another example of a same-origin violation, in which insufficient protection of session tokens can lead to session hijacking, where a token is captured and reused in order to gain the privileges of the user who initiated the session.

XSS and CSRF: These are other examples of a same-origin violation. Cross-site scripting (XSS) and Cross-Site Request Forgery (CSRF) attacks are methods used to compromise user credentials (usually by stealing the user's session token) to a web site. These attacks are more likely a result of server security problems, but some browsers incorporate technologies that try to detect the attacks.

With respect to ATSC 3.0, a specific CSRF attack is the forgery of ATSC 3.0 bootstrap URIs. In ATSC 3.0 such bootstrap URIs can be delivered via OTA, broadband servers, or audio and/or video watermarks. This attack may be applicable to any of these bootstrap signaling delivery methods as further described below.

Re-broadcast Attack—Forged Origin over OTA: This is an example of an XSS or CSRF attack. For bootstrap URIs delivered via OTA, an attacker manipulates the origins of HTML documents in broadcast streams and re-broadcasts the manipulated streams. This attack is described in a paper published by researchers at Columbia University (May 2014) (www.cs.columbia.edu/~angelos/Papers/2014/redbutton-usenix-sec14.pdf).

When an attacker changes the origin of HTML documents in broadcast streams to other sites such as social media or bank sites, a web browser would allow the broadcast application to access the cookies of the social media or bank sites as it considers the broadcast application has the origins of these sites.

A remedy has been proposed by HbbTV and considered by ATSC 3.0: the origins of HTML documents delivered in broadcast streams are defined as a "dvb:" or "astc3:" URL constructed from information in the broadcast signal, instead of using an "http" or "https" URL as the origin. However, this remedy would not prevent a broadcast application from accessing the another broadcast application's local storage such as cookies with a forged origin starting with "dvb:" or "atsc3:".

T.WATERMARK Watermark Attack: Watermark attacks involve an attacker embedding or modifying ATSC 3.0 audio and/or video watermarks without authorization. When analyzing the security threats related to watermarks, it is assumed that network eavesdropping and network attacks described earlier have been appropriately eliminated or contained. Watermark attacks often involve an attacker pirating a content and distributing the content containing malicious audio and/or watermarks. The attacker may record the content received from legitimate distribution channel (e.g., OTA, cable, or OTT), embed malicious watermarks, and (1) distribute the content containing the malicious watermarks to the ATSC 3.0 receiver through a OTT receiver via HMDI; and/or (2) rebroadcast the content containing the malicious watermarks to a ATSC 3.0 receiver using unauthorized OTA transmitters.

The attacker may also upload the content containing malicious watermarks to user generated content (UGC) and social media sites, or distribute such content as illegitimate subscription services (e.g., with proprietary apps or STB without ads).

Audio and Video Watermark—Copy Attack: In this attack scenario, an attacker embeds the watermarks carrying legitimate payloads in one content segment into another content segment by detecting the legitimate payloads from the first content and embedding them into the second content. These operations would allow an attacker to transfer the viewership credits from the owner of the first content segment to the owner of the second content segment.

In this scenario, the supplemental content enabled by the legitimate watermark payloads is not likely to be related to the second content segment and may cause confusion to the consumers. An attacker can further set a display override field in in legitimate payloads to "true" to disable presentation of the supplement content. Such an attack is applicable to both ATSC 3.0 video and audio watermarks.

VP1 Audio and Video Watermark—DNS Flood: DNS flood is a type of Distributed Denial of Service (DDoS) attack in which the attacker targets one or more Domain Name System (DNS) servers with the goal to make these DNS servers unavailable to resolve legitimate recovery server addresses. In an attack scenario, an attacker embeds watermarks carrying malicious payloads with unregistered servers that would cause the receivers to frequently request for a resolution that does not exist. This attack turns all receivers that receive the content containing malicious payloads into botnets attempting to hamper resolution of resource records of one or more DNS servers. For example, an attacker may embed the VP1 Payloads in a content segment containing the following values: an unregistered server code and a query flag value change in every 1.5 interval of the content segment, and/or a different unregistered server code in every 1.5 interval of the content segment. This attack is applicable to VP1 audio and video watermark.

VP1 Audio and Video Watermart—Recovery Server DDoS: This attack would turn all receivers that receive the content containing malicious payloads into botnets with an attempt to make the recovery server unavailable. In an attack scenario, an attacker embeds the watermarks carrying malicious payloads with registered server codes that would cause the receivers to frequently query the legitimate recovery server. A registered server code is compliant with the ATSC specifications (e.g., correct payload format) and registered with a VP1 registrar. For example, an attacker may embed the VP1 Payloads in a content segment containing the following values: a registered server code that can be resolved to a recovery server address, and a query flag value change in every 1.5 interval of the content segment, and/or a discontinuous server code in every 1.5 interval of the content segment. This attack is applicable to VP1 audio and video watermark.

VP1 Audio and Video—False Display Override Flag: In an attack scenario, an attacker embeds new watermarks or modifies the existing audio or video watermarks in a content to carry a forged Display Override flag. This attack may allow an attacker to disable any supplemental content presented by broadcast application, including but limited to. targeted ads (as replacement to or overlay over primary program).

Video Watermark—DNS Flood: In an attack scenario, an attacker embeds new watermarks or modifies the existing watermarks in a content to carry malicious messages (e.g., BSID change every frame) that cause the receiver to perform frequent queries on non-existing server address (unsolvable by DNS). This is a similar to the DNS flood attack described earlier. It should be noted that the instant DNS Flood as related to video watermark differs from the previously described DNS attack. For example, the previous DDOS occurs 1) on DNS servers with unregistered VP1 Server code, or 2) on recovery server with forged VP1 payload (e.g., forged query flag or server code change that will cause frequent connection to recovery server). In the video watermark message case (except the case where the video watermark message is a VP1 Payload), most signaling information is directly carried in the video watermark message without the need to contact a broadband server. However, certain video watermark message change (e.g., BSID which uniquely identifies a service) may require a server (i.e. a signaling server that is different from the recovery server) connection to obtain additional service information.

Video Watermar—Signaling Server DDoS: This attack turns all receivers that receive the content containing malicious payloads into botnets with an attempt to make the signaling server unavailable. In an attack scenario, an attacker embeds the watermarks carrying malicious payloads containing different BSID and/or major_channel_no and minor_channel_no (which identify services) frequently (e.g., BSID values change in every video frame or every few frames). Each BSID change in the malicious payloads would trigger the receiver to query the legitimate signaling server (for service and application signaling).

This attack is applicable to video watermark excluding VP1 Message. Various server-based countermeasures mitigating DDoS attacks have been extensively researched and deployed. Our solution will focus on preventing such attack caused by watermarks.

Video Watermark—Forgery of content_id_message( ) In an attack scenario, an attacker embeds the watermarks or modifies the existing watermarks in a content to carry forged content IDs (CIDs). This attack would allow an attacker to claim the viewership credits from the content containing the forged CIDs. The attacker may also change the BSID and major_channel_no and minor_channel_no values to be consistent with the forged CIDs. This attack is only applicable to video watermarks excluding VP1 Message.

Video Watermark—Forgery of dynamic_event_message( ) This attack would allow an attacker to send forged dynamic events to a legitimate broadcast application to perform undesired actions (e.g., disabling targeted ad replacement). In an attack scenario, an attacker embeds the watermarks or modifies the existing watermarks in a content to carry forged Dynamic Events. Dynamic events are sent to broadcast application in a proprietary format. However, such format can be easily unveiled by examining the broadcast application written in JavaScript. This attack is only applicable to video watermarks excluding VP1 Message.

Video Watermark—False emergency alert message( ) In an attack scenario, an attacker embeds the watermarks or modifies the existing watermarks in a content to carry false emergency alerts (e.g., the forged CAP_message_url for false CAP message that is likely presented by the receiver or a legitimate broadcast application). This attack would allow an attacker to issue false emergency alerts causing large-scale safety and security issues. This attack is only applicable to video watermarks excluding VP1 Message.

Video Watermarks—False display_override_message( ) In an attack scenario, an attacker embeds the watermarks or modifies the existing watermarks in a content to carry forged display_override_message( ) in video watermark. This attack may allow an attacker to disable any supplement content presented by broadcast application, including but limited to targeted ads (as replacement to or overlay over primary program).

It should be noted that the threats or attacks described in this document are not mutually exclusive. They may be combined to create new attacks. For example, an attack can transfer signaling data recovered via audio watermarks to video watermarks by performing the following steps: (1) detect audio watermarks from a content and obtain the signaling data from a recovery server; (2) remove the audio watermark, and (3) modify the signaling data retrieved from the recovery server and insert the modified signaling data into video watermarks; or insert the same signaling data retrieved from the recovery server into a different content.

Security Solutions

In this section, we will focus on security solutions for threats introduced by watermarks. All security solutions for watermark threats rely on trust anchors provided by either TLS or code signing using public key infrastructure.

TLS and Code Signing: To address the network eavesdropping and network attack threats described earlier, concerning signaling transmission between the TOE and remote network entities, the conformant TOE will use a trusted communication path. The TOE will be capable of communicating using one (or more) of these standard protocols: trusted ATSC 3.0 over-the-air transmission or TLS 1.3.

The ATSC Security and Service Protection Standard for ATSC 2.0 specify TLS and key and certificate management. The signaling transmitted over-the-air can be secured using Code-Signing specified in the same standard. Additional security techniques and policy related to broadcast application security such as same origin and mixed content may be needed in ATSC 3.0.

TLS: When the browser in a receiver loads a resource from an Internet server (e.g., example.com) over TLS, the browser is able to make three assertions to address the network eavesdropping and network attack threats.

(1) Authentication: the receiver is communicating with a server that is allowed to claim to be example.com, and not one of the many, many servers through which the request has hopped. The connection can be authenticated.

(2) Confidentiality: the receiver's communications with example.com cannot be trivially eavesdropped upon by middlemen, because the requests it makes and the responses it receives are encrypted.

(3) Integrity: the receiver's communications with example.com cannot be trivially modified by middlemen, the encryption and authentication provide a guarantee of data integrity.

TLS is applied to all of the following communications: (1) between a Recovery Server and Watermark Client in the receiver; (2) between a Signaling Server and Service/Application Signaling Manager in the receiver; and (3) between the broadcast application runtime environment and the local web server in the receiver.

Code Signing: Code signing provides another layer of security on top of TLS in case that the signed data is delivered via TLS, or authentication and integrity for signed data delivered over unsecure channel. In this document, code signing can be used to provide authentication and integration for: Certain types of wm_message( ) that need to be carried directly in video watermarks; the Web origin of broadcast application delivered via OTA; and the broadcast application delivered via OTA.

Limited Attempts and Whitelist: To address DNS flood attack, the receiver can make a limited number of query attempts when encountering a large number of sequential unresolvable Server Codes or URIs. Another approach is to deliver a whitelist of Server Codes. Both of the solutions are described in further detail below.

Server Code Whitelist: In systems that implement the whitelist approach, the receiver queries a Receiver Server only if the detected VP1 Payload is in a whitelist (or not in a blacklist) of Server Codes stored in the receiver. The whitelist (or blacklist) is delivered to the receiver in OCSP object during previous TLS connection with a recovery server. This solution requires both TLS and recovery server support OCSP carrying a whitelist (or blacklist) for Server Code. Note that OCSP is required by ATSC 2.0 when TLS is used.

Limited Attempts: In systems that implement the limited attempt approach, when a large number of VP1 Payloads contain Server Codes that are unsolvable by DNS, the receiver can make recovery server queries using only selective Server Codes to mitigate the threat. The same approach is applicable to the attack when a large number of unresolvable URIs (for signaling server, usage reporting server, or ESG server) carried in video watermark. DNS flood attack is mainly handled by DNS servers, which is out of scope of the document.

VP1 Payload Verification Using RDT: In systems that implement this approach, to address the threats resulting from introducing malicious VP1 Payloads, the receiver verifies any VP1 Payload reported by watermark detector using the RDT retrieved from a trusted recovery server.

Verification of Query Flag using the VP1 Payload in RDT: In systems that implement this approach, if the VP1 Payload in the RDT is not identical to the detected VP1 Payload causing the retrieval of the RDT, the receiver can discard the VP1 Payload, and subsequent N (e.g., N=10) VP1 Payloads if these VP1 Payloads are discontinuous or contain the query flag. If the RDT is not available (e.g., due to no Internet connection), the receiver terminates the application associated with the current service. This solution requires RDT to contain the query flag value in addition to server code and interval code.

Verification of Discontinuous VP1 Payload Using RDT: In systems that implement this approach, if the VP1 Payload in the RDT is not identical to the detected VP1 Payload causing the retrieval of the RDT, the receiver discards the VP1 Payload and subsequent N (e.g., N=10) VP1 Payload if they are discontinuous. If the RDT is not available (e.g., due to no Internet connection), the receiver terminates the application associated with the current service.

Deferred Verification of Display Override Flag Using VP1 Payload in RDT: In systems that implement this approach, if a Display Override flag in a VP1 Payload is detected, the receiver performs the required actions without delay. Additionally, it retrieves a RDT using the detected VP1 Payload, and compares it with the VP1 Payload in the RDT. If they are not identical, the receiver may reverse the actions caused by the Display Override flag, and can discard the subsequent Display Override flags for a period of time or the entire Watermark Segment. If RDT is not available (e.g., no Internet connection), the Display Override flag is considered valid without further verification. This solution requires RDT to contain Display Override flag in addition to server code and interval code.

Cross-Verification of Video Watermark Messages with RDT: To address the threats resulting from malicious wm_message( ) directly carried in video watermark in a content, the receiver can verify the wm_message( ) using the RDT recovered through audio watermark in the same content. In this case, wm_message( ) and RDT contain the same signaling data that is synchronized with the content.

The same signaling needs to be recovered using either audio or video watermarks because in some use cases only audio watermark or video watermarks can be detected on the receiver. For example, when the audio is muted on set-top box by the user, the receiver will not access to audio signal and can only rely on video watermarks to recover the signaling. If the user uses a set-top box function to display a full-screen ESG on the receiver, the video watermarks will become undetectable and the receiver can only reply the audio watermark to recover the signaling data.

The solution requires that the same signaling is carried in the video watermarks and in RDT retrieved using the audio watermarks. The presentation times of the signaling data in wm_message( ) and RDT are identical from the same clock. In the case where wm_message( ) is present but VP1 Payload in audio watermarks is absent for a predefined period of time (e.g., 3-5 seconds), the receiver can determine that a forgery of wm_message( ) has been detected. The following subsections titled Direct Comparison and Validation with Hash Code in RDT provide further details.

Direct Comparison: When a receiver detects the wm_message( ) from the video watermark and retrieves a RDT using the audio watermark, it performs the following cross verifications:

(1) If a content_id_message( ) is detected, when content_ID_present is true, compare content_id_message( ) with contentID object in RDT. The verification fails if a content ID in content_id_message( ) at the time t is different from the content ID in the RDT that is valid from t1 to t2 (specified as the validFrom and validUntil values of the contentID object) and $t1 \leq t \leq t2$.

(2) If a content_id_message( ) is detected, when channel ID_present is true, compare content_id_message( ) with sourceID object in RDT. Note that the county field of the sourceID is not used in comparison as it is absent in content_id_message( )

(3) If a uri_message( ) is detected, compare uir_message( ) with svcInetUrl object in the RDT. Note that uri_strlen field of uri_message( ) is not used in comparison as it is absent in RDT.

(4) If a dynamic_event_message( ) is detected, compare dynamic_event_message( ) with the dynamic events retrieved from a recovery server using VP1 Payload.

If any of the comparison fails, a forgery of wm_message( ) is detected. As a result, the receiver may decide to discard the wm_message( ) for certain period of time or the entire watermark segment.

Validation with Hash Code in RDT: Instead of direct comparison of signaling data in wm_message( ) and RDT, as described above, an alternate solution is to store a hash code of the wm_message( ) in the RDT. The following steps are performed to create a hash code and place it into a RDT:

(1) Determine whether a wm_message( ) needs to be verified using its hash code; for security reason, this determination is preferably be made randomly.

(2) Once one or more wm_message( ) in a VP1 Interval are selected for verification, (a) calculate a hash code (e.g., 160 bits of SHA-1) for each of the selected wm_message( );

(b) associate each hash code with the presentation time (T) of the last video frame carrying the wm_message( ) and (c) add one or more hash codes with associated presentation times into the immediately successive RDT.

For verification, a receiver buffers each wm_message( ) and the presentation time of the last video frame from which the wm_message( ) is detected during the past 1.5 seconds. This buffer is reset once a discontinuous VP1 Payload or a query flag is detected. When a RDT containing one or more hash codes with associated presentation times is obtained, the receiver performs the following steps for verification:

(1) identify the wm_message( ) that needs to be verified by matching the presentation times of the wm_message( ) in the buffer with the presentation times associated with the hash codes in the RDT; and (2) for each wm_message( ) with a matched presentation time:

(a) calculate the hash code from the wm_message( ) in the same way as it was calculated prior to being placed in the RDT.

(b) compare the hash code of the wm_message( ) with the corresponding hash code in the RDT.

If any one of the comparison fails, a forgery of wm_message( ) is detected. The receiver may discard the video watermark for a period of time or the entire watermark segment.

This solution requires: VP1 Payload in audio and/or video components of the content; and a hash code and associated presentation time for each wm_message( ) to be verified to be added to the RDT as specified in ATSC 3.0. The proposed changes to the RDT are described later in this document.

Digitally Signed Video Watermark Messages: wm_message( ) can be digitally signed and the digital signature can be carried in video watermark for integrity and authentication verification by receivers. In particular, three types of wm_message( )("signed messages") may need to be carried directly in video watermarks:

(1) For emergency_alerts_message( ) that carries the emergency alert information and display_override_message( ) that may carry the burned-in video emergency alert, an important requirement is to deliver them to the receiver even when the Internet is not available.

(2) Compared to the RDT approach, carrying uri_message( ) directly in video watermark may reduce the latency. Signing this type of message can mitigate the risk for attacker to provide forged URLs (e.g., the URL for receivers to send usage reporting data).

A digital signature is carried immediately following the message in the video watermark as described below. The digital signature is produced in the following steps:

(1) Calculate a 160-bit SHA-1 hash value from wm_message_block( ) containing the self-verified message, and truncate the hash value to a 64-bit hash code by discarding the most significant bits;

(2) Encrypt the 64-bit hash code using the private key of one of the code signing certificates that belong to the current service. The code signing certificates are managed in accordance the prescribed protocols and are available to the receiver. The encrypted hash code becomes a signature.

(3) If the message is carried as multiple fragments in video watermark, a second 64-bit hash code is created from the entire message following the above steps 1) and 2). The encrypted second hash code becomes a message signature.

Table 5.2 of the ATSC 3.0 Candidate Standard is revised below to replace CRC_32 and message_CRC_32 fields with the signature and message signature fields, respectively, for the wm_message( ) that requires digital signature as shown below. The revisions to the table are shown by the underlined text.

TABLE 5.2

Revised - Bit Stream Syntax for the Watermark Message Block

| Syntax | No. of Bits | Format |
|---|---|---|
| wm_message_block( ) { | | |
|    wm_message_id | 8 | uimsbf |
|    wm_message_block_length | 8 | uimsbf |
|    wm_message_version | 4 | uimsbf |
|    fragment_number | 2 | uimsbf |
|    last_fragment | 2 | uimsbf |
|    wm_message_bytes( ) | var | |
|    if ((fragment_number == last_fragment) && (fragment_number != 0)) { | | |
|      if <messag message id identifies a message type requiring code signing> message signature | <u>64</u> | <u>bslbf</u> |
|      else message_CRC_32 | 32 | uimsbf |
|    } | | |
|    if <messag message id identifies a message type requiring code signing> signature | <u>64</u> | <u>bslbf</u> |
|    <u>else</u> CRC_32 | 32 | uimsbf |
| } | | |

When the receiver detects a single fragment message with wm_message_id indicating digital signature is required, it performs the following steps for validation of self-verified messages:

(1) Calculate the 64-bit hash code from the detected wm_message_block( ) in the same way as it was calculated prior to embedding in the video watermark.

(2) Locate the code signing certificates for the current service (which may be identified using BSID and other service identifiers); an interface between watermark client and receiver may need to be defined to allow the watermark client to either call signature verification function or access to the code signing certificates.

(3) Decrypt the detected signature using the public key in the code signing certificate.

(4) Compare the decrypted signature with the 64-bit hash code. If they are identical, the message is validated.

(5) If more than one code signing certificates associated with the current service are available, repeat steps 2)-4) until the validation is successful or all code signing certificates have been applied.

If the validation fails, the receiver shall discard the wm_message( ) This solution requires the changes to Table 5.2 as highlighted above.

Web Cryptography API: In addition to the solutions described above, WebCrypto API can be used to address the attack against dynamic_event_message( ) carried in video watermark. WebCrypto API describes a JavaScript API for performing basic cryptographic operations in web applications, such as hashing, signature generation and verification, and encryption and decryption. Additionally, it describes an API for web applications to generate and/or manage the keying material necessary to perform these operations. Broadcasters may wish to encrypt certain fields of dynamic_event_message( ) The WebCrypto API allows a broadcast application the decrypt such encrypted fields in the dynamic_event_message( ) The receiver treats dynamic_event_message( ) as opaque objects and pass them to the broadcast application.

Association of Signaling Data with Content: To address the copy attack described earlier in this document, the receiver is configured to not only verify the signaling data carried in watermarks but also to determine that the content containing the signaling data is the same content in which the signaling data was originally embedded even after the content has been processed. Digital fingerprinting is commonly used to identify the content even after the content has been processed. The sections that follow describe a content identification methodology and system that uses video fingerprints. However, the described techniques are also applicable to audio fingerprints.

In a content redistribution scenario, the content received by the receiver may have been significantly modified by an upstream device (e.g., STB) through partial or full screen overlays (e.g., EPG). Fortunately, most such modifications can be detected by the receiver. If the receiver identifies a significant modification to the audio or video components, it disables the verification based on audio or video fingerprints, respectively.

Content Hash Verification: Let's assume a content hash generation function h=H(c) and a binary hash matching function M(h,c) which returns 1 for M(H(c),c') when c' is a broadcast version of c and 0 for M(H(c),d), when c and d are different content with low probability of type 1 and 2 errors. In statistical hypothesis testing, a type I error is the incorrect rejection of a true null hypothesis (a "false positive"), while a type II error is incorrectly retaining a false null hypothesis (a "false negative"). More simply stated, a type I error is detecting an effect that is not present, while a type II error is the failure to detect an effect that is present.

If a reference hash H(c) of the payload interval of the broadcast content c is included in the recovery data table for the watermark in that payload interval, then the receiver can use M(H(c),c') where c' is the received content from which the payload is detected to validate that no copy attack has been performed. As described earlier, a copy attack is where an attacker places a watermark payload which is intended to be associated with a content into a different content. Other known mechanisms for securing the recovery data table such as DNS registrar and recovery data table signing are not effective against the copy attack.

The above described hash verification technique has high applicability to securing the VP1 system, which is vulnerable to the copy attack. This disclosed content hash verification also differs from typical fingerprinting techniques in that it is not necessary to efficiently search for a matching hash from a large database of candidates; only a single hash match must be considered. It also differs in that the reference hash is transmitted to the device from the server rather than the candidate hash being transmitted from the device to the server.

Requirements for Video Fingerprint: A fingerprint technique to address the copy attack needs to meet, or can benefit from, the requirements below.

(1) Fingerprint extraction must introduce no or negligible latency in video watermark embedding.

(2) Fingerprint extraction must require no more computation resources including CPU and memory than the video watermark embedding does.

(3) The fingerprint should be video frame based, i.e., a fingerprint is generated from a single video frame.

(4) The size of a fingerprint should be small, ideally less than 64 bits.

(5) The fingerprints must be invariant to content processing such as frame rate change, compression and resolution change, after which the video watermark survives.

(6) The fingerprint match may have a reasonable false positive rate (e.g., 1%) but must have a significantly low false negative rate (e.g., $10^{-6}$).

The disclosed solution requires a standardized fingerprint technology including algorithms for fingerprint extraction and match, and fingerprint data format. There are two trusted ways to make the pre-generated fingerprints available the receiver: including them in an RDT or carrying them in the video watermark using code signing.

A Video fingerprint Technique: A video fingerprint technique is designed for the purpose of content verification. However, other fingerprint techniques such as the audio and video fingerprint standard specified by SMPTE for lib synchronization can be also used.

Fingerprint Data Format: A fingerprint of a video frame includes one or more vectors, and each vector includes of the following fields: (1) w-bit window size that defines up to 2w sizes of rectangular windows of the video frame from the center; and (2) for each window size, an r-bit region relationship defines up to $2^r$ relationships between the luminance values in 4 regions with equal size of the window. The luminance value in a region is calculated by summing the luminance values of all pixels in the region.

Figure 14:
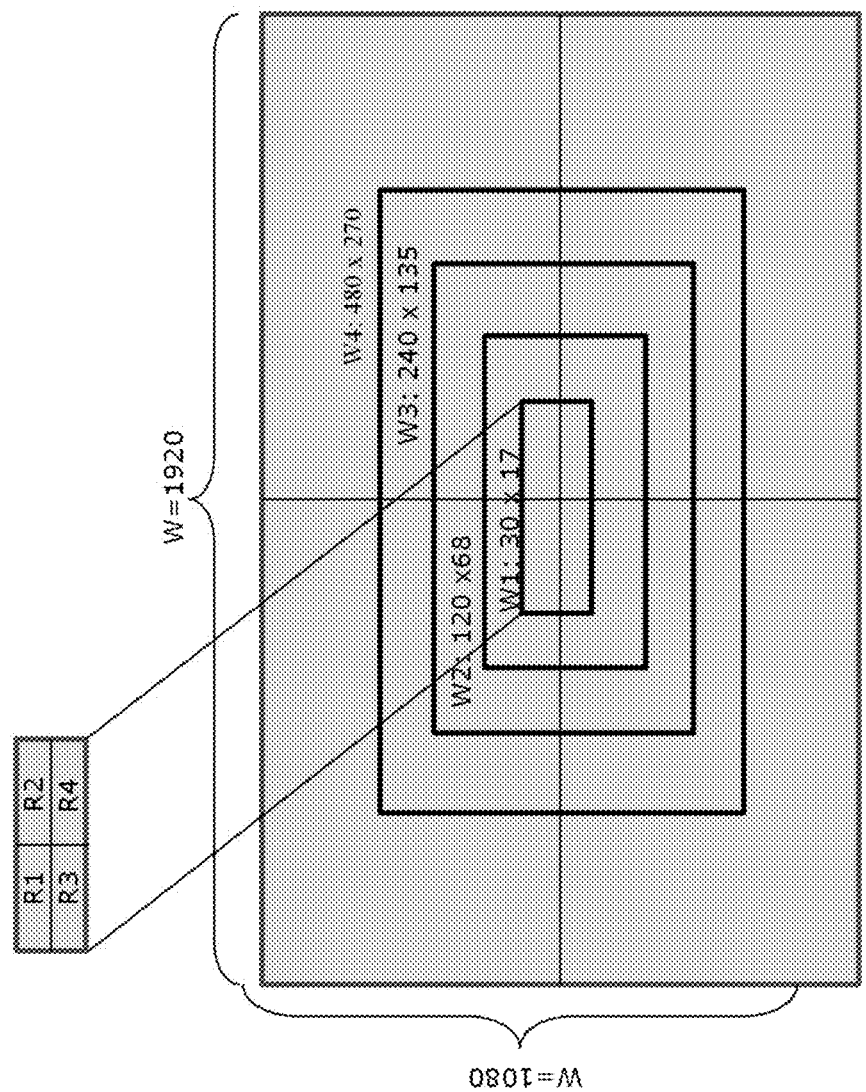
FIG. 14 illustrates an exemplary fingerprint configuration for a video frame in accordance with an exemplary embodiment.

FIG. 14 shows an exemplary fingerprint configuration with w=2 and r=4. Assume W and H are the width and height of the video frame. Four windows W1-W4 are defined and width and height of each window is defined as W/Si and H/Si, respectively. Si (1≤i≤4) is a predefined constant ratio with values of 8,16,32,64 for W1, W2, W3, and W4, respectively. Twelve (12) relationships are defined in Table 1 where Luma(Ri) is the total luminance value of the region Ri (1≤i≤4) in a window, and T is a predefined threshold value with the default value 5%. The threshold value is defined based on the requirement for robustness of the fingerprint.

TABLE 3

Definition of relationship between the luminance values in 4 regions

| Relationship Value | Relationship | Relationship Value | Relationship |
|---|---|---|---|
| 0x00 | Luma(R1) > Luma(R2) by T | 0x06 | Luma(R2) > Luma(R3) by T |
| 0x01 | Luma(R1) < Luma(R2) by T | 0x07 | Luma(R2) < Luma(R3) by T |
| 0x02 | Luma(R3) > Luma(R4) by T | 0x08 | Luma(R1) > Luma(R3) by T |
| 0x03 | Luma(R3) < Luma(R4) by T | 0x09 | Luma(R1) < Luma(R3) by T |
| 0x04 | Luma(R1) > Luma(R4) by T | 0x0A | Luma(R2) > Luma(R4) by T |
| 0x05 | Luma(R1) < Luma(R4) by T | 0x0B | Luma(R2) < Luma(R4) by T |

Fingerprint pre-generation: The following example facilitates understanding of fingerprint pre-generation.

Let's assume N is the maximum number of vectors allowed for a video frame, n is the current number of vectors in the video frame and let's set the initial value of n to 0. For the current window, start from the window with the smallest size to the window with the largest window size, if m relationships in Table 3 are satisfied, set n to n+m. If n is equal or greater than N, store the first N vectors as the fingerprint data of the video frame. Otherwise, set the current window to the window with a larger size until all windows are used.

As an example representing a fingerprint from a video frame as a result of the fingerprint extraction function, a vector of the fingerprint is stored as an ASCII character with window size in the fifth and sixth bits, and relationship value in the first to 4th bits, from the least significant bit. Note that it is possible that no fingerprint can be generated for a video frame.

Fingerprint extraction and match: At content verification phase, the fingerprint is extracted from a video frame in the same way as the fingerprint pre-generation step described above except that the value of T defined in Table 3 is reduced depending on the requirement for the false positive rate. The smaller T value is, the higher the false positive rate, i.e. a different test content is more likely confirmed falsely as the original content. The default value of T at verification phase is 0.5%.

Assume that the fingerprint extracted for matching from a video frame is f', and the pre-generated fingerprints from n consecutive video frames in a Message Block are f1, f2, . . . , fn ("Message Block fingerprint list"). If f' matches with one of the fingerprints in the list f1,f2, . . . , fn, content verification is confirmed. Two fingerprints f' and fi (1≤i≤n) are matched if both window size and relationship values of every vector in fi are identical to the window size and relationship values of at least one vector in f'.

Figure 15:
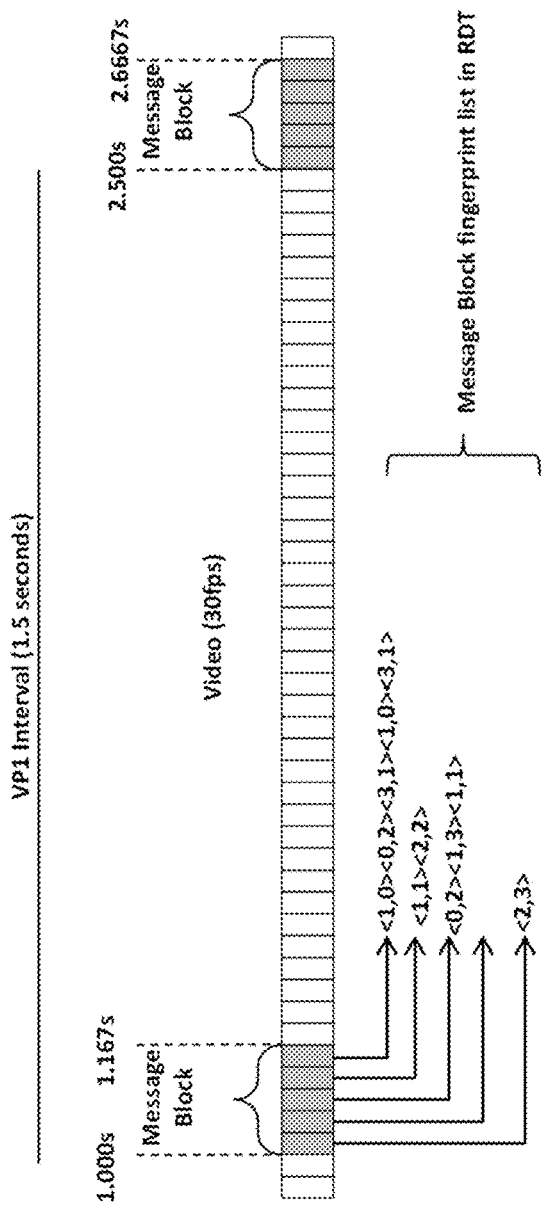
FIG. 15 illustrates an exemplary message block fingerprint list for a video content in accordance with an exemplary embodiment.

Content Verification with Video Fingerprint in RDT: This is an extension of the approach described earlier in this document. A fingerprint is calculated for each of the video frames in a Message Block. The fingerprints in a Message Block are formatted as a list of fingerprints ("Message Block fingerprint list"), and stored as digest in a RDT (further details are provided in the section that follows titled "Exemplary RDT Extension"). An example of Message Block fingerprint list is shown in FIG. 15.

When the video watermark detector detects a discontinuous VP1 Payload that may indicate a service change or a query flag in the detected VP1 payload, it continues to: (1) perform the fingerprint extraction from the video frame where such VP1 Payload is detected; and (2) include the extracted fingerprint in the detection event reported to the watermark client.

Once the watermark client receives a detection event that causes a recovery server query and contains a fingerprint, it performs the following steps for verification: (1) obtain the Message Block fingerprint list from digest object of the RDT retrieved from a recovery server; and (2) compare a fingerprint in the Message Block fingerprint list with the extracted fingerprint repeatedly until a match is found or all fingerprints in the Message Block fingerprint list have been used for comparison. If a match is found, the watermark client determines that the content from which the fingerprint extracted by the watermark detector is the same content from which the Message Block fingerprint list were extracted.

In addition to the requirement to embed VP1 payloads in audio and/or video components of the content, this extension requires: (1) addition of a field in the RDT for Message Block fingerprint list as a digest associated with the VP1 Payload; and (2) including a fingerprint extraction function in the video watermark detector, and a fingerprint matching function in watermark client.

The disclosed countermeasure relies on the availability of RDT that is only retrieved when service change occurs or a query flag is detected. An attacker can attempt to defeat the countermeasure by making RDT unavailable. However, if signaling data including the content identifier is not available to the receiver, it will not be able to identify the content being viewed and report the usage that would benefit for the attacker.

Verification using Video Fingerprint Carried in Video Watermark: This is an extension of the approach described earlier in this document.

fingerprint_message( ) is defined as a new type of wm_message( ) to carry a fingerprint calculated from a video frame. When wm_message( ) is present, it is mandatory to carry a fingerprint_message( ) periodically (e.g., at one fingerprint( ) in every 5 minutes a watermark segment). Like emergency_alerts_message( ) and display_override_message( ) fingerprint_message( ) requires code signing as described earlier.

When the video watermark detector detects a fingerprint_message( ) it performs fingerprint extraction from the video frame where such a fingerprint_message( ) is detected. The video watermark detector reports both fingerprint_message( ) and extracted fingerprint to the watermark client. When watermark client receives a fingerprint_message( ) it first verifies the digital signature for integrity and authentication of the a fingerprint_message( ) as described earlier in this document. If the verification is successful, the watermark client then compares the decrypted fingerprint_message( ) with the extracted fingerprint. If a match is found, the watermark client determines that the content from which the fingerprint extracted by the watermark detector is the same content from which the fingerprint_message( ) was calculated.

Exemplary RDT Extension: Revised Table 5.24 below illustrates exemplary extensions to the data recovery table (RDT), and specifically to Table 5.24 that is specified in the ATSC 3.0 Candidate Standard. The extensions to the table are shown by the underlined text.

TABLE 5.24

Revised - Recovery File Format Logical Structure

| Element or Attribute Name | Use | Data Type | Format |
|---|---|---|---|
| RecoveryDataTable | 1 | | Root element |
|   thisComponent | 1 | | The media component from which the VP1 Payload carrying serverCode and intervalCode was detected. |
|     serverCode | 0...1 | integer | The serverCode value from the query request to which the recovery data table was provided as a response. |
|     intervalCode | 0...1 | integer | The intervalCode value from the query request to which the recovery data table was provided as a response. |
|     qeuryFlag | 0...1 | boolean | |
|     displayOverrideFlag | 0...1 | boolean | |
|     componentDescription | 1 | object | The description of this component, ... |
|     digest | 0...N | object | See Digest definition. |

Table 5.24A (below), which can be incorporated as part of Table 5.24, provides specific components and format structure of the Digest component of Revised Table 5.24.

TABLE 5.24A

Specifics of Digest Component

| Element or Attribute Name | Use | Data Type | Format |
|---|---|---|---|
| Digest | 1 | | |
|   digestType | 1 | integer | The type of the digest for the component. Two values are defined: 0x00 indicates cryptographic digest of a video watermark message; 0x01 indicates content digest of the component. Note that 1) when the value is 0x00, the mediaType of the component shall be "video"; 2) when the value is 0x01 and the mediaType of the component is "audio", the content digest is an audio fingerprint; 3) when the value is 0x01 and the mediaType of the component is "video", the content digest is an video fingerprint. |
|   digestData | 1 | string | The digest data of an audio or video frame. |
|   validFrom | 0...1 | string (date-time) | When Digest is valid from; if not specified, the digest is calculated from a single video frame. |
|   validUntil | 0...1 | string(date-time) | Up to when Digest is valid until; if not specified, use the last video frame where the VP1 Payload is detected for matching. |

Additional Comments Regarding Security Countermeasure: The security solutions discussed above rely on the following trust anchors: (1) the RDT from a recovery server is trusted as it is secured by TLS; and (2) the signed messages carried in video watermark can be verified for integrity and authentication.

Table 4 summarizes the threats to ATSC signaling data and the potential solutions addressing these threats. Note that the solutions are not mutually exclusive and multiple solutions can be employed or combined to countermeasure the attacks. The proposed security solutions or countermeasures can be implemented in the watermark detector and/or watermark client without or with the inputs from the receiver. An example of the inputs from the receiver is the code signing certificates provided by the receiver for self-verification solution.

In addition to countermeasure solutions, at least three types of data provided by the receivers to Internet servers can be used to identify and trace certain attacks: (1) IP address of the receiver, 2) requests for RDT, and 3) usage data. For example, if the content identifiers in usage report for a service reported from receivers do not match the content identifiers in actual playlist or collected by broadcast monitoring, a red flag is raised for further investigation

TABLE 4

Summary of Threats to ATSC 3.0 Signaling and Associated Countermeasures

| Threats | Causes | Solutions |
|---|---|---|
| T.EAVESDROP Network Eavesdropping | Between signaling server and receiver | TLS |
| | Between runtime and proxy server | TLS |

TABLE 4-continued

Summary of Threats to ATSC 3.0 Signaling and Associated Countermeasures

| Threats | | Causes | Solutions |
|---|---|---|---|
| T.NETWORK Network Attack | | Between signaling server and receiver | TLS |
| | | Between runtime and proxy server | TLS |
| T.SAMEORIGIN_VIOLATION | XSS and CSRF (Cross-Site Request Forgery) (forged origin) | Forged SLS delivered via OTA | Code Signing |
| T.WATERMARK Watermark Attack | Audio and Video Watermark: Copy Attack | Copy watermark | Association of Signaling Data with Content |
| | VP1 Audio and Video Watermark: DNS Flood | Unresolvable Server Code | Limited Attempts and Whitelist |
| | VP1 Audio and Video Watermark: Recovery Server DDoS | Malicious Query Flag | Verification of Query Flag using the VP1 Payload in RDT |
| | | Discontinuous VP1 Payload | Verification of Discontinuous VP1 Payload Using RDT |
| | VP1 Audio and Video: False Display Override Flag | False Display Override | Deferred Verification of Display Override Flag Using VP1 Payload in RDT |
| | Video Watermark: DNS Flood | Unsolvable URIs | Limited Attempts and Whitelist |
| | Video Watermark: Signaling Server DDoS | False BSID | Cross-Verification of Video Watermark Messages with RDT |
| | Video Watermark: Forgery of content_id_message( ) | Forged CIDs | Cross-Verification of Video Watermark Messages with RDT |
| | Video Watermark: Forgery of dynamic_event_message( ) | Forged Dynamic Events | Web Cryptography API or Cross-Verification of Video Watermark Messages with RDT |
| | Video Watermark: False emergency alert message( ) | False Emergency Alerts | Digitally Signed Video Watermark Messages |
| | Video Watermarks: False display_override_message( ) | False Display Override | Digitally Signed Video Watermark Messages |

Figure 16:
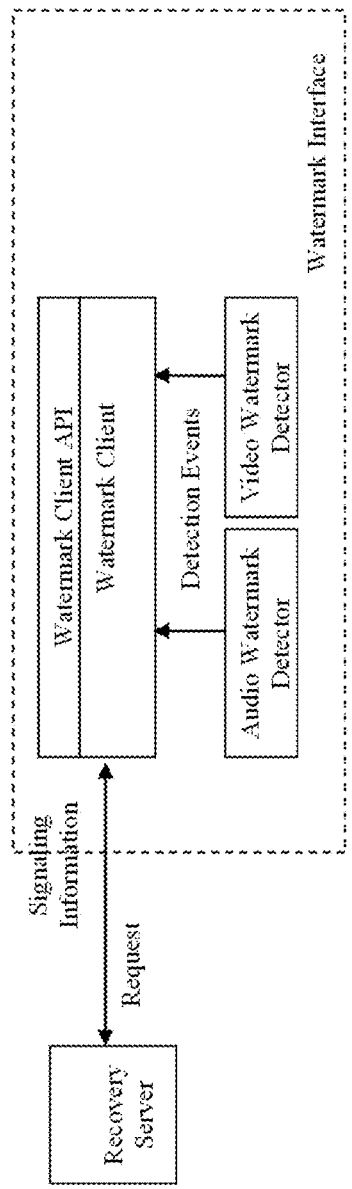
FIG. 16 illustrates an exemplary watermark interface in accordance with an exemplary embodiment.

Receiver Security Functionality: Most security functions addressing the threats introduced by watermarks can be implemented in Watermark Interface module as shown in FIG. 16. Watermark Interface includes Watermark Client, Audio Watermark Detector and Video Watermark Detector, as shown in as shown in FIG. 16. Audio (or Video) Watermark Detector takes the uncompressed audio (or video) content as an input, processes the content to extract watermark payloads, and reports Detection Events based on the detected payloads.

The Watermark Client receives the Detection Events from both Audio Watermark Detector and Video Watermark Detector, processes the Detection Events, and provides a Watermark Client API to the receiver. The Watermark Client API includes events based on the current Detection Events and sometimes the future Detection Events from Audio and/or Video Watermark Detectors. The event API includes two types of events: the events delivered by broadcasters and the events caused by the upstream content modification as described in Table 5. It should be noted that the above noted API is an interface provided by the watermark client to the receiver. This is an event-driven APIs that allows the watermark client to notify the receiver of the upstream modification.

TABLE 5

Content Modifications

| # | Upstream Modification | Description |
|---|---|---|
| 1 | Channel Change | The user switches to a new channel (including the initial automatic tuning), and the program of the new channel contains no watermark, Audio Watermark only, Video Watermark only, or both Audio and Video Watermarks. |
| 2 | Audio Change | The user switches to a new audio track of the same channel (e.g., a new language) that contains VP1 Payloads that are different from ones in the previous audio track. |
| 3 | Video Change | The user switches to a new video of the same channel (e.g. a new camera angle) that contains VP1 Payloads that are different from ones in the previous video. |
| 4 | Full-Screen Overlay | Full screen graphic overlay (e.g., due to full-screen EPG or placing the channel in PIP mode) that removes Video Watermark |
| 5 | Partial Screen Overlay | Partial screen overlay on the Input Video that retains Video Watermark (e.g., due to partial-screen EPG. closed caption, video banners) |

TABLE 5-continued

Content Modifications

| # | Upstream Modification | Description |
|---|---|---|
| 6 | Audio Mute | Audio muted for at least 3 seconds due to audio routing or user audio muting at the upstream source. |
| 7 | EAS Presentation | Both source audio and video are replaced by an Emergence Alert Message (EAS) to be presented without modification or obstructions by any Enhancements. |
| 8 | Pause | Pause during playback of recorded content that contains Audio and/or Video Watermark |
| 9 | Rewind | Rewind during playback of recorded content that contains Audio and/or Video Watermark |
| 10 | Fast Forward | Fast forward during playback of recorded content that contains Audio and/or Video Watermark |
| 11 | Skip Ahead | Skips ahead greater 8*1.5 + 1/6 seconds of recorded content contains Audio and/or Video Watermark during playback. |
| 12 | Skip Back | Skips back greater than 8*1.5 + 1/6 seconds of recorded content contains Audio and/or Video Watermark during playback. |
| 13 | Channel Acquisition | Channel acquisition during Channel Change. Low Energy Components (muted audio and blank video frames) are often introduced during Channel Change. |

When the watermark detector detects a query flag or discontinuous VP1 Payload, it performs fingerprint extraction and includes the extracted fingerprint in the detection event reported to the watermark client, as described earlier in this document. When a query flag or discontinuous VP1 Payload is detected by watermark detector, the watermark client in the receiver performs the following:

(1) request an HTTP connection with a Recovery Server over TLS with a list of trusted root certificates that are stored in the secure storage of the receiver (if the TLS connection is successful, the response of the Recovery Server includes a RDT);

(2) compare the values of the detected VP1 payload and the VP1 payload in the RDT including the values of query flags, display override flags, server code, and interval code (if the values are identical, the detected VP1 payload can be trusted. Otherwise, the detected VP1 payload is forged and returns NULL);

(3) if the OtherComponent object in RDT indicates that the same signaling can be recovered in video watermarks and RDT, and if a wm_message( ) is received from a video watermark detector, compare signaling data in wm_message( ) and the RDT as described in earlier in this document to determine whether they are identical. If not identical, the detected VP1 payload is forged and returns NULL.

(4) If the detection event received by watermark client may cause reporting of service change and contains a fingerprint, it performs content verification by matching the fingerprints reported the watermark detector with the fingerprints in the RDT as described earlier in this document;

(5) If the detection event received by watermark client may cause reporting of service change and contains a fingerprint, it performs content verification by matching the fingerprints reported the watermark detector with the fingerprints in the RDT as described earlier in this document.

If a wm_message( ) is detected and there is no indication that the same signaling data is present in wm_message( ) and RDT, the watermark client performs the following: If the wm_message( ) is a message type that must be signed, and iff the signature or message signature is available, perform signature verification as described earlier in this document. However, if the signature or message signature is not available, or the verification is not successful, the wm_message( ) is discarded.

One exemplar aspect of the disclosed technology relates to a method of attacking a watermark system includes acquiring a legitimate watermark containing a payload from a segment of a first content owned by a first content owner; and embedding watermarks containing the first payload into a segment of a second content owned by a second owner, wherein viewership credits are transferred to the second content owner. In one embodiment of such a method, the watermark is an audio watermark; in another embodiment, the watermark is a video watermark.

Another exemplary aspect of the disclosed technology relates to a method of associating signaling data with content that include, after content has been processed, using a fingerprinting technique to determine that content containing signaling data is the same content in which the signaling data was originally embedded. In one embodiment of this method, the fingerprinting technique is based on a fingerprint from a single video frame. In one exemplary embodiment, the size of the fingerprint is less than 64 bits. In yet another embodiment, the fingerprint is invariant to content processing. In still another exemplary embodiment, the above method further includes making pre-generation fingerprints available to a receiver by employing at least one of the following: including the pre-generation fingerprints in a Recovery Data Table or using code signing.

Another exemplary aspect of the disclosed technology relates to a method of associating signaling data with content that includes defining a content hash generation function h=H(c), defining a binary hash matching function M(h,c) which returns 1 for M(H(c),c') when c' is a broadcast version of c and 0 for M(H(c),d) when c and d are different content with low probability of type 1 and 2 errors. The above method also comprises including a reference hash H(c) of the payload interval of the broadcast content c in a recovery data table for a watermark in a payload interval, and employing a receiver to use M(H(c), c'), where c' is the received content from which the payload is detected to validate that no copy attach has been performed, whereby after content has been processed, it can be determined that content containing signaling data is the same content in which the signaling data was originally embedded.

Another exemplary aspect of the disclosed technology relates to a method of verifying a watermark payload that includes receiving in a receiver a watermark payload extracted from a watermark detector, determining if the received watermark payload is identical to a previously stored payload in a Recovery Data Table, and discarding the received watermark payload if it is not identical to the previously stored payload in the Recovery Data Table. In one exemplary embodiment, the Recovery Data Table includes a query flag value, a server code and an interval code. In another exemplary embodiment, the above method further includes terminating the application if the Recovery Data Table is not available.

Another exemplary aspect of the disclosed technology relates to a method of verifying a watermark payload that includes receiving in a receiver a video watermark payload extracted from a watermark detector, receiving in a receiver an audio watermark payload extracted from a watermark detector, retrieving a Recovery Data Table using the received audio watermark, determining if the received video watermark payload is identical to a previously stored payload in the Recovery Data Table, and discarding the received video watermark payload if it is not identical to the previously stored payload in the Recovery Data Table.

Figure 17:
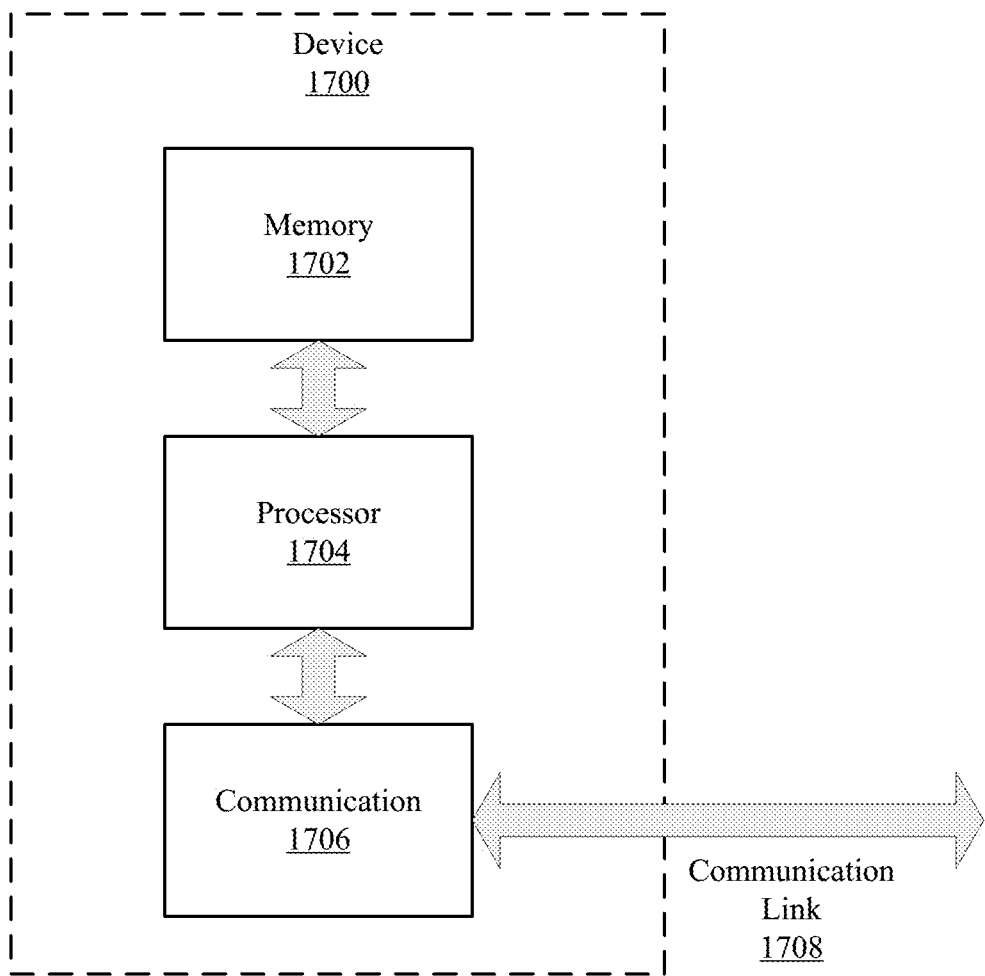
FIG. 17 illustrates a block diagram of a device within which various disclosed embodiments may be implemented.

It is understood that the various embodiments of the present invention may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 17 illustrates a block diagram of a device 1700 within which various disclosed embodiments may be implemented. The device 1700 comprises at least one processor 1702 and/or controller, at least one memory 1704 unit that is in communication with the processor 1702, and at least one communication unit 1706 that enables the exchange of data and information, directly or indirectly, through the communication link 1708 with other entities, devices and networks. The communication unit 1706 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

Referring back to FIG. 17 the connectivity between the modules and/or components within the modules may be provided using any one of the connectivity methods and media that is known in the art, including, but not limited to, communications over the Internet, wired, or wireless networks using the appropriate protocols.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by a processor or by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

The invention claimed is:

1. A method for facilitating access to additional information associated with a multimedia content, comprising:
 receiving the multimedia content at a receiver device that includes a fingerprint computation engine and a watermark extractor that are implemented at least partially in hardware;
 generating fingerprint information by the fingerprint computation engine using one or more segments of the multimedia content;
 transmitting the fingerprint information to a fingerprint server;
 receiving a first metadata from the fingerprint server in response to the transmitted fingerprint information, the first metadata associated with a content interval and including information regarding access to a metadata server;
 extracting one or more watermarks from the multimedia content using the watermark extractor;
 using the first metadata to construct and transmit a query to the metadata server;

receiving a second metadata in response to the transmitted query, the second metadata comprising a metadata table that includes watermark information;

verifying a payload of the one or more extracted watermarks with the watermark information from the metadata table; and based on a result of the verifying, initiating one or more actions.

2. The method of claim 1, wherein the metadata server is a trusted recovery server.

3. The method of claim 1, wherein the verifying includes determining whether the payload of the one or more extracted watermarks is present in the metadata table, and upon a determination that the payload of the one or more extracted watermarks is not present in the metadata table, discarding the extracted payload.

4. The method of claim 3, further comprising discarding a plurality of subsequent watermarks.

5. The method of claim 4, comprising discarding the payloads obtained from the plurality of subsequent watermarks if the payloads obtained from the plurality of subsequent watermarks are discontinuous.

6. The method of claim 1, wherein the verifying includes determining whether the payload of the one or more extracted watermarks matches a payload listed in the metadata table upon a determination that the payload of the one or more extracted watermarks matches a payload listed in the metadata table, indicating that the payload of the one or more extracted watermarks can be trusted.

7. The method of claim 1, wherein the information regarding access to the metadata server includes a uniform resource location (URL).

8. The method of claim 1, wherein the metadata table received as part of the second metadata enables access to a secondary content.

9. The method of claim 1, wherein the metadata table received as part of the second metadata includes information regarding access to an advertisement.

10. The method of claim 1, wherein the metadata table received as part of the second metadata includes information regarding access to an interactive service.

11. The method of claim 1, further comprising using the second metadata to embed a second set of watermarks into the multimedia content.

12. The method of claim 11, wherein the second set of watermarks includes a content identifier.

13. The method of claim 12, wherein the content identifier includes one or more of an EIDR, or AD-ID.

14. The method of claim 11, wherein the second set of watermarks includes a start and an end time, on the broadcast timeline, of an interval associated with the second metadata.

15. The method of claim 11, wherein the second set of watermarks includes information that identifies a distributor of the multimedia content.

16. A device to facilitate access to additional information associated with a multimedia content, comprising:

a processor; and a memory comprising instructions stored therein, wherein the instructions upon execution by the processor cause the processor to:

receive at least a portion of a multimedia content at a receiver device that includes a fingerprint computation engine and a watermark extractor;

generate fingerprint information by the fingerprint computation engine using one or more segments of the multimedia content;

transmit the fingerprint information to a fingerprint server;

receive a first metadata from the fingerprint server in response to the transmitted fingerprint information, the first metadata associated with a content interval and including information regarding access to a metadata server;

extract one or more watermarks from the multimedia content using the watermark extractor;

use the first metadata to construct and transmit a query to the metadata server;

receive a second metadata in response to the transmitted query, the second metadata comprising a metadata table that includes watermark information;

verify a payload of the one or more extracted watermarks with the watermark information from the metadata table; and based on a result of verification of the one or more extracted watermarks with the watermark information from the metadata table, initiate one or more actions.

17. The device of claim 16, wherein the metadata server is a trusted recovery server.

18. The device of claim 16, wherein the verification includes determining whether the payload of the one or more extracted watermarks is present in the metadata table, and the instructions upon execution by the processor cause the processor to, upon a determination that the payload of the one or more extracted watermarks is not present in the metadata table, discard the extracted payload.

19. The device of claim 18, wherein the instructions upon execution by the processor further cause the processor to discard a plurality of subsequent watermarks.

20. The device of claim 19, wherein the instructions upon execution by the processor cause the processor to discard the payloads obtained from the plurality of subsequent watermarks if the payloads obtained from the plurality of subsequent watermarks are discontinuous.

21. The device of claim 16, wherein the verification includes determining whether the payload of the one or more extracted watermarks matches a payload listed in the metadata table upon a determination that the payload of the one or more extracted watermarks matches a payload listed in the metadata table, indicating that the payload of the one or more extracted watermarks can be trusted.

22. The device of claim 16, wherein the information regarding access to the metadata server includes a uniform resource location (URL).

23. The device of claim 16, wherein the metadata table received as part of the second metadata enables access to a secondary content.

24. The device of claim 16, wherein the metadata table received as part of the second metadata includes information regarding access to an advertisement.

25. The device of claim 16, wherein the metadata table received as part of the second metadata includes information regarding access to an interactive service.

26. The device of claim 16, wherein the instructions upon execution by the processor further cause the processor to use the second metadata to embed a second set of watermarks into the multimedia content.

27. The device of claim 26, wherein the second set of watermarks includes a content identifier.

28. The device of claim 27, wherein the content identifier includes one or more of an EIDR, or AD-ID.

29. The device of claim 26, wherein the second set of watermarks includes a start and an end time, on the broadcast timeline, of an interval associated with the second metadata.

30. The device of claim 26, wherein the second set of watermarks includes information that identifies a distributor of the multimedia content.

31. A non-transitory memory comprising instructions stored thereon for execution by a processor, comprising:
- instructions for receiving the multimedia content at a receiver device that includes a fingerprint computation engine and a watermark extractor that are implemented at least partially in hardware;
- instructions for generating fingerprint information by the fingerprint computation engine using one or more segments of the multimedia content;
- instructions for transmitting the fingerprint information to a fingerprint server;
- instructions for receiving a first metadata from the fingerprint server in response to the transmitted fingerprint information, the first metadata associated with a content interval and including information regarding access to a metadata server;
- instructions for extracting one or more watermarks from the multimedia content using the watermark extractor;
- instructions for using the first metadata to construct and transmit a query to the metadata server;
- instructions for receiving a second metadata in response to the transmitted query the second metadata comprising a metadata table that includes watermark information;
- instructions for verifying a payload of the one or more extracted watermarks with the watermark information from the metadata table; and
- instructions for, based on a result of the verifying, initiating one or more actions.

* * * * *